(12) United States Patent
Matsumura et al.

(10) Patent No.: US 12,074,678 B2
(45) Date of Patent: Aug. 27, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 293 days.

(21) Appl. No.: 17/635,153

(22) PCT Filed: Aug. 15, 2019

(86) PCT No.: PCT/JP2019/032002
§ 371 (c)(1),
(2) Date: Feb. 14, 2022

(87) PCT Pub. No.: WO2021/029061
PCT Pub. Date: Feb. 18, 2021

(65) Prior Publication Data
US 2022/0294512 A1   Sep. 15, 2022

(51) Int. Cl.
*H04B 7/06* (2006.01)
*H04B 7/08* (2006.01)
(Continued)

(52) U.S. Cl.
CPC ...... *H04B 7/0695* (2013.01); *H04W 72/1263* (2013.01); *H04W 76/19* (2018.02); *H04W 80/02* (2013.01)

(58) Field of Classification Search
CPC . H04B 7/0695; H04B 7/088; H04W 72/1263; H04W 76/19; H04W 80/02; H04W 16/28
See application file for complete search history.

(56) References Cited

U.S. PATENT DOCUMENTS

2019/0190582 A1*   6/2019   Guo .................. H04B 17/17
2020/0052769 A1*   2/2020   Cirik ................. H04L 5/0094
(Continued)

FOREIGN PATENT DOCUMENTS

JP   2017-069962 A   4/2017

OTHER PUBLICATIONS

Office Action issued in counterpart Japanese Patent Application No. 2021-539787 mailed on May 30, 2023 (6 pages).
Office Action issued in counterpart Chinese Patent Application No. 201980101391.7 mailed on Jun. 8, 2023 (15 pages).
H. Huawei; "Beam failure recovery for SCell with new beam information"; 3GPP TSG RAN WG1 Meeting #97, R1-1907533; Reno, USA; May 13-17, 2019 (7 pages).
(Continued)

*Primary Examiner* — Harry H Kim
(74) *Attorney, Agent, or Firm* — Osha Bergman Watanabe & Burton LLP

(57) ABSTRACT

One aspect of a terminal in the present disclosure includes a receiving section that receives downlink control information that uses at least one of a specific RNTI (Radio Network Temporary Identifier) and a specific field; and a control section that, when a beam failure is detected, controls transmission of information related to at least one of a cell in which the beam failure is detected and a new candidate beam by using at least one of an uplink shared channel scheduled in the downlink control information and a configured grant based uplink shared channel configured after receiving the downlink control information.

6 Claims, 18 Drawing Sheets

(51) Int. Cl.
  *H04W 16/28* (2009.01)
  *H04W 72/1263* (2023.01)
  *H04W 76/19* (2018.01)
  *H04W 80/02* (2009.01)

(56) References Cited

U.S. PATENT DOCUMENTS

| | | | | |
|---|---|---|---|---|
| 2020/0322031 | A1* | 10/2020 | You | H04L 5/001 |
| 2020/0322035 | A1* | 10/2020 | Shi | H04W 72/046 |
| 2021/0013948 | A1* | 1/2021 | Agiwal | H04W 80/02 |
| 2021/0028848 | A1* | 1/2021 | Tsai | H04W 72/23 |
| 2021/0028849 | A1* | 1/2021 | Chin | H04B 7/06964 |
| 2021/0029724 | A1* | 1/2021 | Tsai | H04W 72/569 |
| 2021/0036757 | A1* | 2/2021 | Yu | H04B 7/0626 |
| 2021/0314051 | A1* | 10/2021 | Yang | H04L 5/001 |
| 2022/0132364 | A1* | 4/2022 | Lee | H04W 28/0278 |
| 2022/0149922 | A1* | 5/2022 | Wang | H04W 76/19 |
| 2022/0311500 | A1* | 9/2022 | Zheng | H04L 5/0091 |
| 2022/0368406 | A1* | 11/2022 | Kang | H04L 5/0053 |
| 2023/0170979 | A1* | 6/2023 | Kang | H04L 5/0053 |
| | | | | 375/347 |

OTHER PUBLICATIONS

Intel Corporation; "Summary 2 on L1-SINR and SCell BFR"; 3GPP TSG RAN WG1 Meeting #97, R1-1907825; Reno, USA; May 13-17, 2019 (22 pages).
Intel Corporation; "Summary on L1-SINR and SCell BFR"; 3GPP TSG RAN WG1 Meeting #97, R1-1907674; Reno, USA; May 13-17, 2019 (21 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report for corresponding International Application No. PCT/JP2019/032002, mailed Dec. 3, 2019 (3 pages).
Written Opinion for corresponding International Application No. PCT/JP2019/032002, mailed Dec. 3, 2019 (4 pages).
Intel Corporation; "Summary 2 on L1-SINR and SCell BFR"; 3GPP TSG RAN WG1 Meeting #97, R1-1907892; Reno USA; May 13-17, 2019 (22 pages).
Office Action issued in counterpart Chinese Patent Application No. 201980101391.7 mailed on Dec. 1, 2023 (12 pages).

* cited by examiner

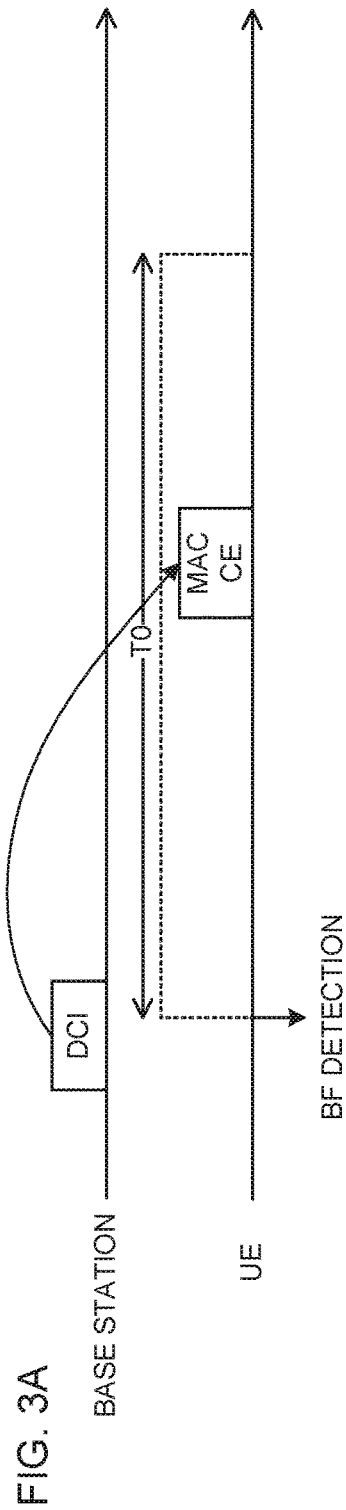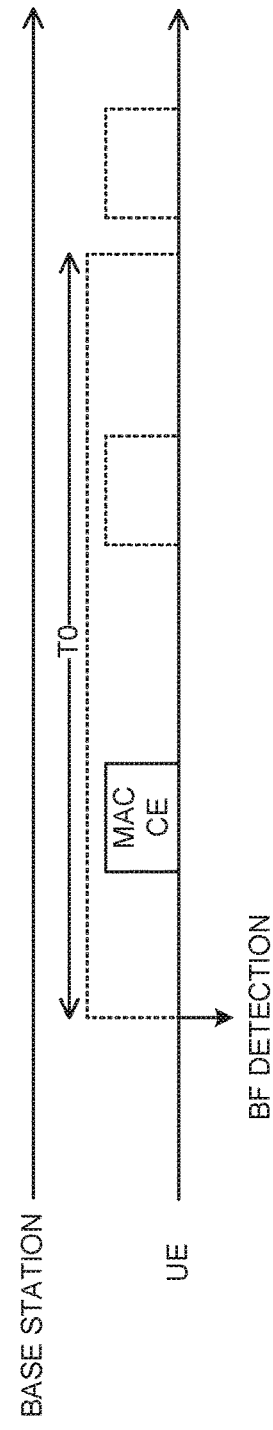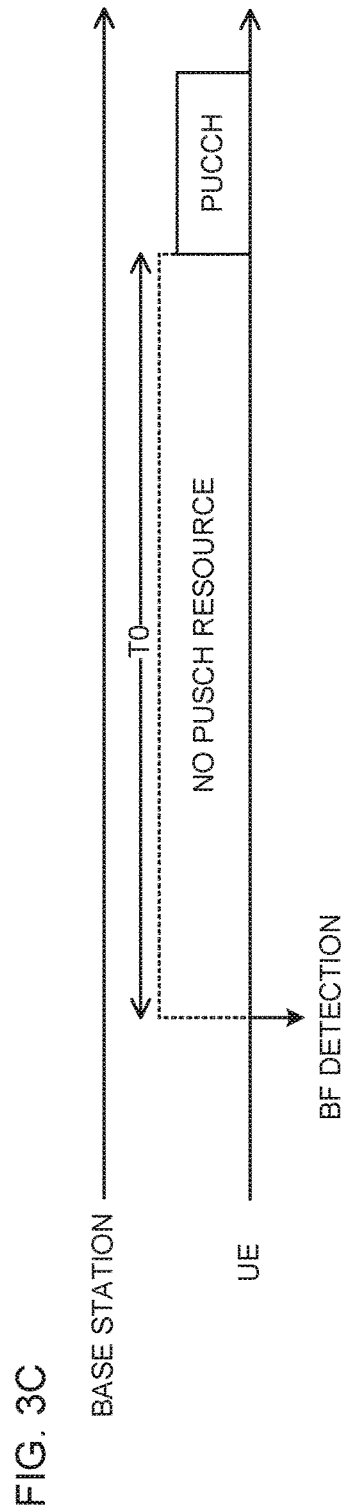

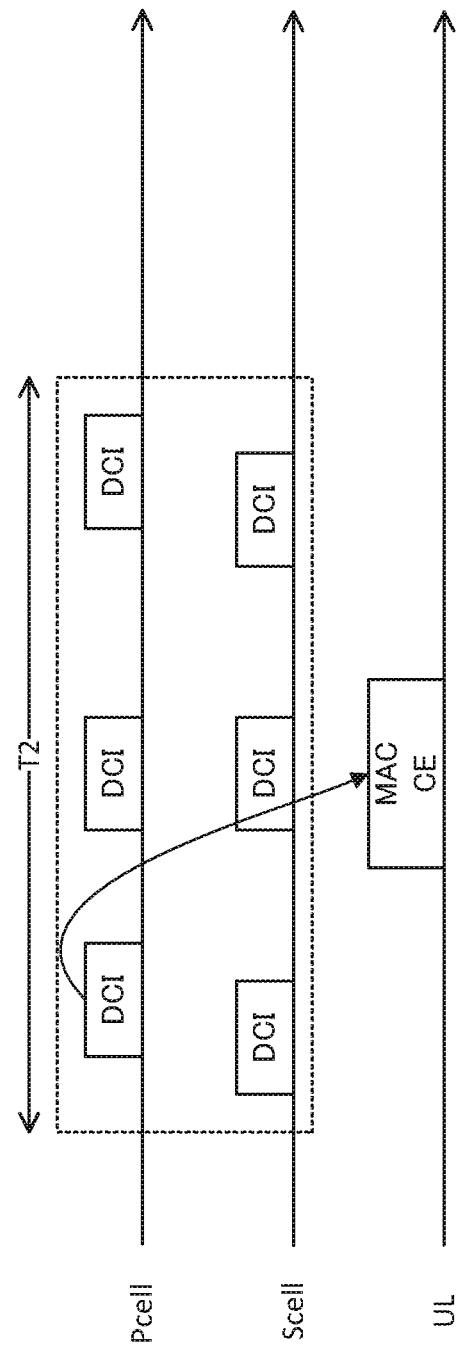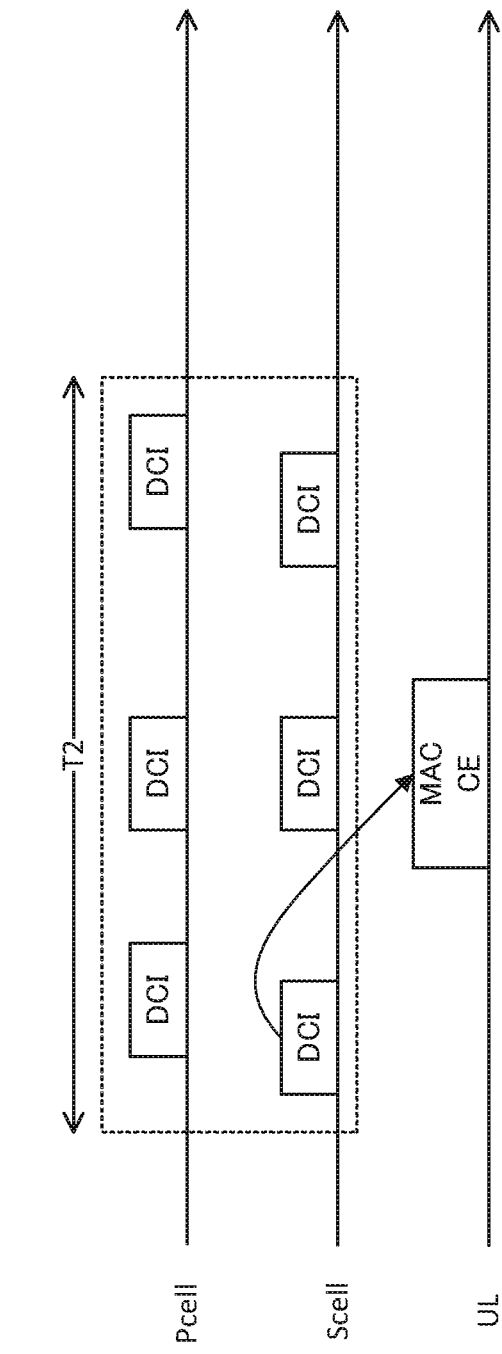

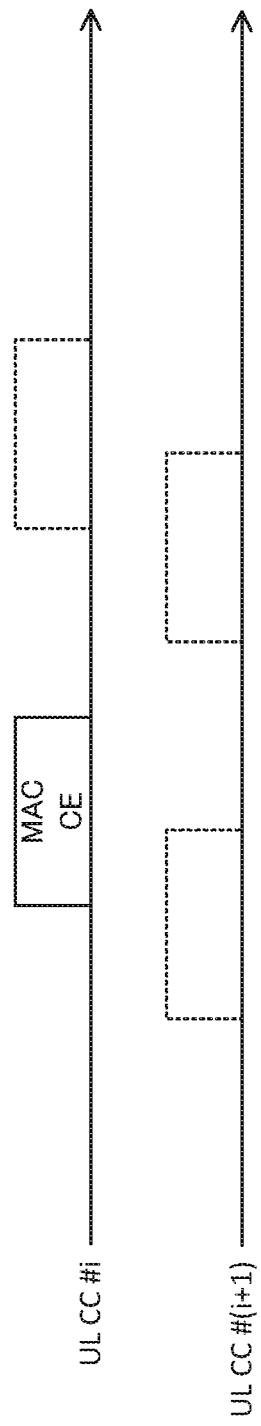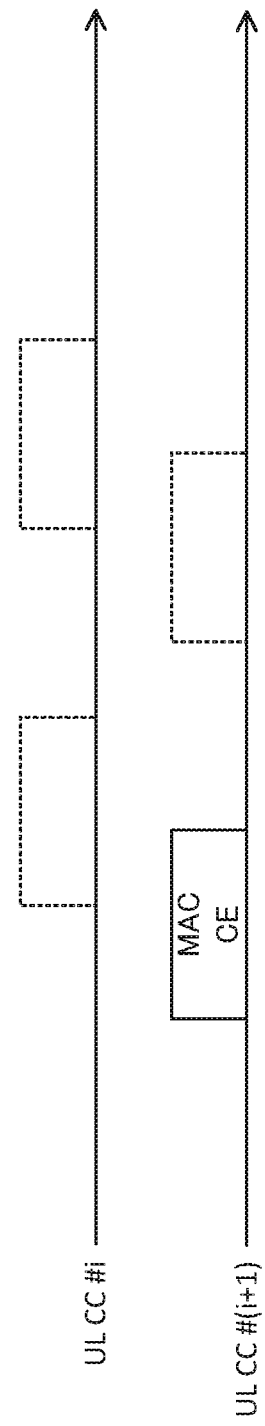

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further higher speed data rates, lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of the LTE (for example, also referred to as 5th generation mobile communication system (5G), 5G+(plus), New Radio (NR), 3GPP Rel. 15 (or later versions), and so on) are also being considered.

In existing LTE systems (LTE Rel.8 to Rel. 14), monitoring of radio link quality (Radio Link Monitoring: RLM) is performed. When a Radio Link Failure (RLF) is detected by the RLM, re-establishment of a Radio Resource Control (RRC) connection is requested to a user terminal (User Equipment (UE)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), consideration is being made to perform a procedure for detecting a beam failure (BF) and switching to another beam (which may also be referred to as a beam failure recovery (BFR) procedure, BFR and so on.). In the BFR procedure, when the beam failure occurs, the UE reports a beam failure recovery request (BFRQ) requesting for the recovery of the beam failure.

For the BFR procedure, consideration is made for the UE to report notification of the beam failure detection, information related to a beam failure occurring cell, and information related to a candidate beam that is new (also referred to as new candidate beam), by using one or more steps.

However, how to control the reporting operation using one or more steps in the BFR procedure has not been sufficiently considered. If the BFR procedure is not appropriately performed, this may lead to deterioration in system performance such as delay of the BFR.

Thus, one of the objects of the present disclosure is to provide a terminal and a radio communication method that can appropriately control a BFR procedure.

Solution to Problem

A terminal according to one aspect of the present disclosure includes a receiving section that receives downlink control information that uses at least one of a specific RNTI (Radio Network Temporary Identifier) and a specific field; and a control section that, when a beam failure is detected, controls transmission of information related to at least one of a cell in which the beam failure is detected and a new candidate beam by using at least one of an uplink shared channel scheduled in the downlink control information and a configured grant based uplink shared channel configured after receiving the downlink control information.

Advantageous Effects of Invention

According to one aspect of the present disclosure, the BFR procedure can be appropriately performed.

BRIEF DESCRIPTION OF DRAWINGS

FIGS. 3A to 3C are diagrams to show an example of a BFR procedure according to a first aspect;
FIGS. 12A and 12B are diagrams to show another example of the BFR procedure according to the third aspect;
FIGS. 13A and 13B are diagrams to show another example of the BFR procedure according to the third aspect.

DESCRIPTION OF EMBODIMENTS

<Beam Failure Recovery>
For NR, consideration is being made to perform communication using beam forming. For example, a UE and a base station (for example, gNodeB (gNB)) may use a beam (also referred to as transmit beam, Tx beam, and so on) used to transmit signals, and a beam (also referred to as receive beam, Rx beam, and so on) used to receive signals.

When beam forming is used, it is susceptible to disturbance by an obstacle, and thus the radio link quality is assumed to degrade. The degradation in the radio link quality may frequently cause radio link failure (RLF). Since re-connection with a cell is required when the RLF occurs, frequent occurrence of the RLF may lead to deterioration of system throughput.

For NR, in order to suppress the occurrence of the RLF, consideration is being made to perform, when quality of a specific beam degrades, a procedure for switching to another beam (which may also be referred to as beam recovery (BR), beam failure recovery (BFR), L1/L2 (Layer 1/Layer 2) beam recovery and so on.). Note that the BFR procedure may be simply referred to as BFR.

Note that the beam failure (BF) in the present disclosure may also be referred to as link failure or radio link failure (RLF).

Figure 1:
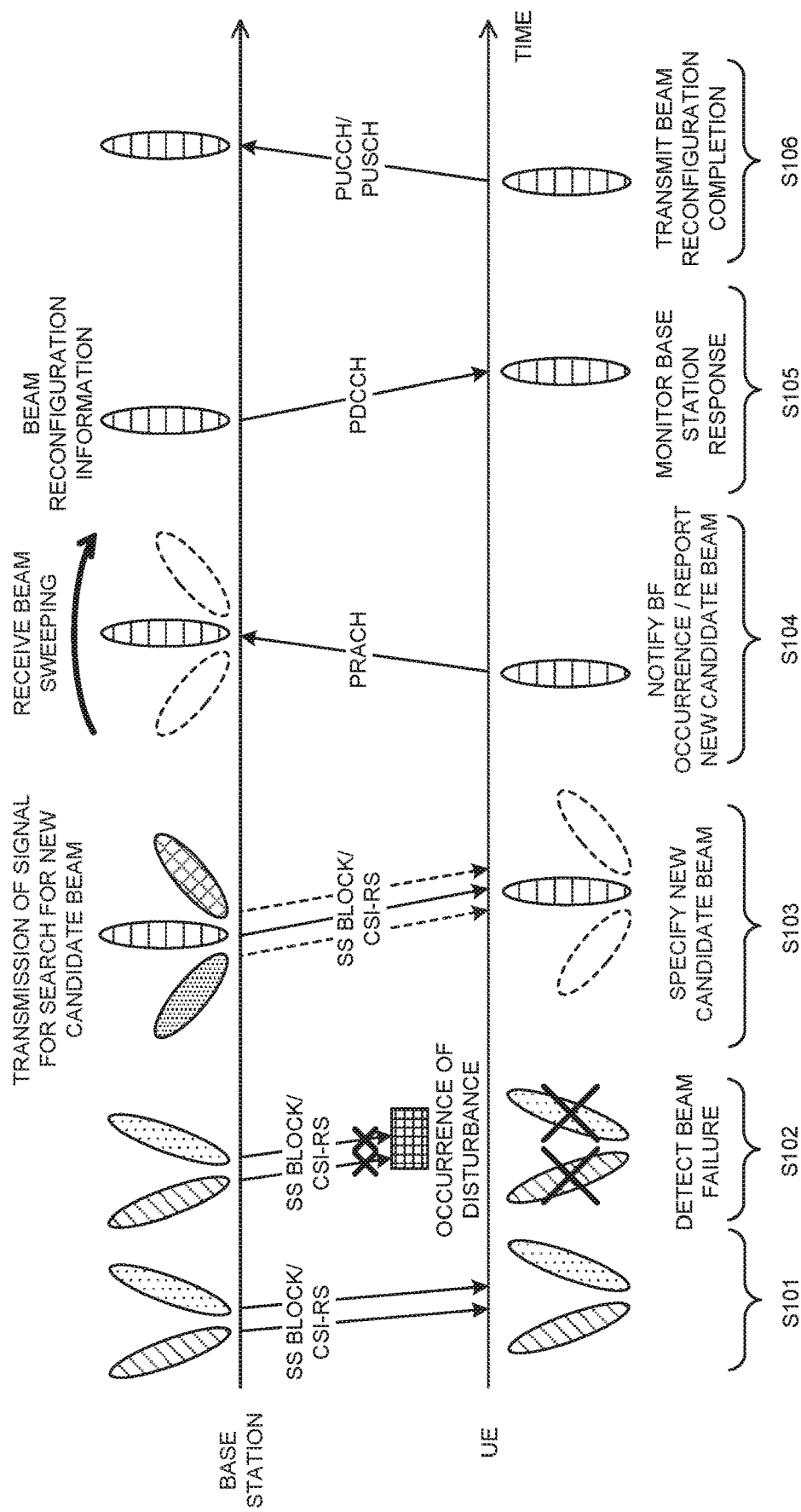
FIG. 1 is a diagram to show an example of a BFR procedure in Rel. 15 NR.

FIG. 1 is a diagram to show an example of a beam recovery procedure in Rel. 15 NR. The number of beams, and so on are an example, and this is not the sole case. In an initial state (step S101) of FIG. 1, the UE performs a measurement based on a Reference Signal (RS) resource that is transmitted using two beams.

The RS may be at least one of a synchronization signal block (SSB) and a channel state measurement RS (Channel State Information RS (CSI-RS)). Note that the SSB may also be referred to as an SS/PBCH (Physical Broadcast Channel) block, and so on.

The RS may be a signal of at least one of a Primary Synchronization Signal (Primary SS: PSS), a Secondary Synchronization Signal (Secondary SS: SSS), a Mobility Reference Signal (Mobility RS: MRS), a signal included in SSB, an SSB, a CSI-RS, a DeModulation Reference Signal (DMRS), a beam-specific signal, and so on or a signal formed by enhancing or modifying such signals. The RS measured in step S101 may also be referred to as the RS for beam failure detection (Beam Failure Detection RS: BFD-RS).

In step S102, when radio wave from the base station is disturbed, the UE fails to detect the BFD-RS (or reception quality of the RS degrades). Such disturbance may occur, for example, by influences of an obstacle between the UE and the base station, fading, interference, and so on.

The UE detects a beam failure when a certain condition is satisfied. The UE may detect the occurrence of beam failure when, for example, a block error rate (BLER) is smaller than a threshold value for all the configured BFD-RSs (BFD-RS resource configuration). When the occurrence of beam failure is detected, a lower layer (physical (PHY) layer) of the UE may notify (indicate)) a beam failure instance to a higher layer (MAC layer).

Note that a judgement criterion is not limited to the BLER, and may be a reference signal received power (Layer 1 Reference Signal Received Power: L1-RSRP) in the physical layer. In place of the RS measurement or in addition to the RS measurement, the beam failure detection may be performed based on a downlink control channel (Physical Downlink Control Channel: PDCCH) and so on. The BFD-RS may be expected to be in quasi-co-location (QCL) with the DMRS of the PDCCH monitored by the UE.

Here, QCL is an indicator indicating statistical properties of a channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception filter/parameter (spatial Rx Filter/Parameter), spatial transmission filter/parameter (Spatial Tx (transmission) Filter/Parameter)) is the same (QCL is satisfied for at least one of these) between such a plurality of different signals/channels.

Note that the spatial reception parameter may correspond to a receive beam of the UE (for example, a receive analog beam), and the beam may be identified based on spatial QCL. The QCL (or at least one element of the QCL) in the present disclosure may be interpreted as spatial QCL (sQCL).

The information related to the BFD-RS (for example, index, resource, number, number of ports, precoding, and the like, of the RS), information related to the beam failure detection (BFD) (for example, threshold value described above), and so on may be configured (notified) to the UE using higher layer signaling, or the like. The information related to the BFD-RS may be referred to as information related to the BFR resource, and so on.

In the present disclosure, for example, the higher layer signaling may be any one of or a combination of Radio Resource Control (RRC) signaling, Medium Access Control (MAC) signaling, broadcast information, and the like.

The MAC signaling may use, for example, a MAC control element (CE), a MAC Protocol Data Unit (PDU), and so on. The broadcast information may be, for example, a master information block (MIB), a system information block (SIB), minimum system information (Remaining Minimum System Information (RMSI)), other system information (OSI), or the like.

The MAC layer of the UE may start a certain timer (which may also be referred to as a beam failure detection timer) when the beam failure instance notification is received from the PHY layer of the UE. The MAC layer of the UE may trigger the BFR (for example, start any of the random access procedures described later) when the beam failure instance notification is received for a given number of times (for example, beamFailureInstanceMaxCount configured in the RRC) or more before the expiration of the timer.

The base station may judge that the UE has detected the beam failure when there is no notification from the UE (for example, when a time period without notification exceeds a certain time period) or when a certain signal (beam recovery request in step S104) is received from the UE.

In step S103, the UE starts a search for a new candidate beam to be newly used for communication for beam recovery. The UE may select a new candidate beam corresponding to the RS by measuring a certain RS. The RS measured in step S103 may also be referred to as an RS for new candidate beam identification (New Candidate Beam Identification RS: NCBI-RS), a CBI-RS, a Candidate Beam RS (CB-RS), and so on. The NCBI-RS may be the same as or different from the BFD-RS. Note that the new candidate beam may also be referred to as a new beam candidate, a candidate beam, or a new beam.

The UE may determine a beam corresponding to the RS that satisfies a certain condition as a new candidate beam. The UE may, for example, determine the new candidate beam based on the RS in which L1-RSRP exceeds a threshold value among the configured NCBI-RSs. Note that the judgement criterion is not limited to the L1-RSRP. Determination may be made using at least any one of L1-RSRP, L1-RSRQ, and L1-SINR (signal to noise interference power ratio). The L1-RSRP related to SSB may be referred to as SS-RSRP. The L1-RSRP related to CSI-RS may be referred to as CSI-RSRP. Similarly, the L1-RSRQ related to SSB may be referred to as an SS-RSRQ. The L1-RSRQ related to CSI-RS may be referred to as a CSI-RSRQ. Similarly, the L1-SINR related to SSB may be referred to as an SS-SINR. The L1-SINR related to the CSI-RS may be referred to as a CSI-SINR.

The information related to NCBI-RS (for example, resource, number, number of ports, pre-coding, and the like, of the RS), the information related to the new candidate beam identification (NCBI) (for example, threshold value described above), and so on may be configured (notified) to the UE using higher layer signaling, and so on. The information related to NCBI-RS may be acquired based on the information related to BFD-RS. The information related to NCBI-RS may be referred to as information related to NCBI resource, and so on.

Note that the BFD-RS, NCBI-RS, and the like may be interpreted as radio link monitoring reference signal (Radio Link Monitoring RS: RLM-RS).

In step S104, the UE that has specified the new candidate beam transmits a beam recovery request (Beam Failure Recovery reQuest (BFRQ). The beam recovery request may also be referred to as beam recovery request signal, beam failure recovery request signal, and the like.

The BFRQ may be transmitted using, for example, a random access channel (Physical Random Access Channel: PRACH). The BFRQ may include information on the new candidate beam specified in step S103. The resource for BFRQ may be associated with the new candidate beam. The information on the beam may be notified using a beam index (BI), a port index of a certain reference signal, a resource index (for example, CSI-RS resource indicator (CRI), an SSB resource indicator (SSBRI), and so on.

In Rel. 15 NR, CB-BFR (Contention-Based BFR) which is the BFR based on a contention-based random access (RA) procedure and CF-BFR (Contention-Free BFR) which is the BFR based on the non-contention-based random access procedure are being considered. In the CB-BFR and the CF-BFR, the UE may transmit preambles (also referred to as RA preamble, random access channel (Physical Random Access Channel: PRACH), RACH preamble and so on) as BFRQ by using the PRACH resource.

In step S105, the base station that has detected the BFRQ transmits a response signal (which may also be referred to as BFR response, gNB response and so on) for the BFRQ from the UE. The response signal may include reconfiguration information (for example, configuration information of the DL-RS resource) on one or a plurality of beams.

The response signal may be transmitted in, for example, the UE common search space of the PDCCH. The response signal may be notified using the PDCCH (DCI) having cyclic redundancy check (CRC) scrambled by an identifier of the UE (for example, cell-radio RNTI (C-RNTI)). The UE may judge at least one of the transmit beam and the receive beam to use, based on the beam reconfiguration information.

The UE may monitor the response signal based on at least one of the control resource set (CORESET) for BFR and the search space set for BFR. For example, the UE may detect the DCI having CRC scrambled by the C-RNTI in the BFR search space within the individually configured CORESET.

Regarding the CB-BFR, the UE may judge that the contention resolution is successful when receiving the PDCCH corresponding to the C-RNTI related thereto.

Regarding the process of step S105, a period for the UE to monitor the response from the base station (for example, gNB) for the BFRQ may be configured. The period may be referred to as, for example, a gNB response window, a gNB window, a beam recovery request response window, a BFRQ response window, and so on. The UE may retransmit the BFRQ when there is no gNB response detected within the window period.

In step S106, the UE may transmit, to the base station, a message indicating that beam reconfiguration is completed. The message may, for example, be transmitted by the PUCCH or may be transmitted by the PUSCH.

In step S106, the UE may receive RRC signaling indicating the configuration of the TCI state used for the PDCCH or may receive MAC CE indicating activation of the configuration.

The beam recovery success (BR success) may represent, for example, a case where step S106 is reached. On the other hand, the beam recovery failure (BR failure) may correspond to, for example, that the BFRQ transmission has reached a certain number of times or a beam failure recovery timer (Beam-failure-recovery-Timer) has expired.

Note that the numbers for these steps are merely numbers for explanation, and a plurality of steps may be collected or the order may be interchanged. Whether or not to perform the BFR may be configured for the UE using the higher layer signaling.

For future radio communication systems (for example, after Rel. 16), when the beam failure is detected, it is considered to use the uplink control channel (PUCCH) and the MAC control information (MAC CE) to notify the occurrence of beam failure, and report information related to a cell (or CC) in which the beam failure is detected as well as information related to the new candidate beam.

Figure 2:
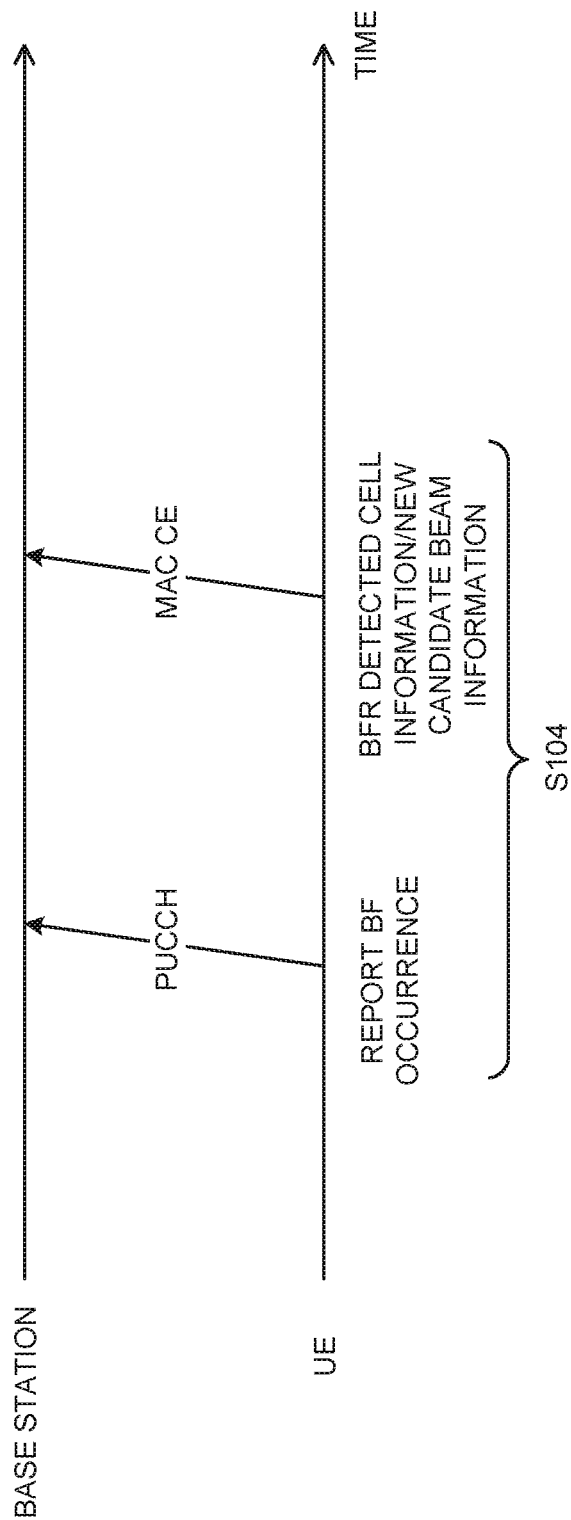
FIG. 2 is a diagram to show an example of a new BFR procedure.

For example, it is conceivable that after detecting the beam failure, the UE uses one or more steps (for example, two steps) to notify the occurrence of the beam failure and to report information related to a cell in which the beam failure is detected as well as information related to the new candidate beam (see FIG. 2). Note that the reporting operation is not limited to two steps.

The uplink control channel can more flexibly configure resources in a time-domain as compared with the PRACH. Thus, it is effective to utilize the uplink control channel (PUCCH) as a channel to utilize for the transmission of BFRQ. MAC CE (PUSCH) can more flexibly configure resources in a time-domain as compared with the PRACH. Thus, it is also considered to use the MAC CE (PUSCH) as a channel to utilize for the transmission of BFRQ.

In FIG. 2, the UE uses the uplink control channel (PUCCH) to notify the occurrence of beam failure in a first step (or step 1). It is assumed that the UE uses the MAC control information (for example, MAC CE) to report at least one of the information related to a cell in which the beam failure is detected and the information related to the new candidate beam in the second step (or step 1).

The PUCCH in the first step may use, for example, a method (dedicated SR-like PUCCH) similar to the transmission of scheduling request (SR). The MAC CE in the second step may be transmitted using an uplink shared channel (PUSCH).

However, in a case where a plurality of steps are configured for the notification of the occurrence of beam failure, the information related to a cell in which the beam failure is detected and the information related to the new candidate beam, how to perform the control of each step or the control between steps is a problem.

The inventors of the present invention have studied the transmission control among a plurality of steps (for example, first step and second step), and came up with the idea of an aspect of the present invention.

In a case where the PUSCH is used to transmit the MAC CE in the second step, how to control the transmission of PUSCH or the transmission of DCI that controls the transmission of PUSCH becomes a problem.

The inventors of the present invention have studied the transmission control of the PUSCH used for the transmission of the MAC CE or the DCI that indicates the transmission of PUSCH, and came up with the idea of other aspects of the present invention.

Embodiments according to the present disclosure will be hereinafter described in detail with reference to the drawings. Respective aspects below may be applied independently or may be applied in combination.

(First Aspect)

In a first aspect, one example of the UE operation after the detection of the beam failure (BF detection) will be described. Specifically, when there are a plurality of steps (for example, step 1 and step 2) after the detection of the beam failure, the UE operation in which some steps (for example, step 1) are omitted is permitted.

In the following description, a case where step 1 of notifying the detection of the beam failure using the PUCCH and step 2 of reporting at least one of the information related to a cell (or CC) in which the beam failure is detected and the information related to a new candidate beam (hereinafter also described as beam failure detected cell/new candidate beam information) by using the MAC CE are configured is assumed.

The information related to a cell may be information indicating an index of a secondary cell (SCell). The information related to a new candidate beam may be information indicating an index of a reference signal (for example, at least one of synchronization signal block (SS/PBCH block) and CSI-RS).

In a case where a transmission occasion of the PUSCH (PUSCH transmission occasion) for the MAC CE exists within a range of a certain period after the beam failure of a certain cell (for example, SCell) is detected, the UE may use the PUSCH to transmit the MAC CE of step 2. In other words, the UE may omit step 1 and perform the operation of step 2.

The range of the certain period (for example, T0) may be controlled by a timer after the detection of the BFR. T0 may be defined in advance in specification or may be configured for the UE from the network (for example, base station). T0 may be defined as a time window or may be defined as a timer.

The transmission using the PUSCH may be configured grant based PUSCH transmission configured by the higher layer signaling or may be dynamic grant based PUSCH transmission scheduled by the DCI. The configured grant based PUSCH transmission may be of type 1 of being configured only by the higher layer signaling, and of type 2 in which activation or deactivation is specified in the DCI in addition to the higher layer signaling.

When the DCI that schedules the PUSCH transmitted within the T0 period is received, and the PUSCH has a resource size sufficient for the transmission of the MAC CE, the UE may omit step 1 and may directly perform step 2 to transmit the MAC CE (see FIG. 3A). The transmission timing of the DCI may be included in the range of T0 or may be outside the range of T0 (for example, before timer start).

Alternatively, when the configured grant based configuration (configured grant configuration) for the PUSCH is configured within the T0 period, and the PUSCH has a resource size sufficient for the transmission of the MAC CE, the UE may omit step 1 and directly perform step 2 to transmit MAC CE.

When a plurality of PUSCH transmission occasions (transmission chances) exist within the T0 range, the UE may select one of the plurality of PUSCH transmission occasions and control to transmit the MAC CE (see FIG. 3B). The PUSCH of transmission occasion may be a transmission occasion of the PUSCH scheduled by the DCI or may be a transmission occasion of the configured grant based PUSCH.

Note that the transmission occasion effective in the transmission of the MAC CE (or step 2) may be the transmission occasion of the PUSCH configured in a certain cell. The certain cell may be only PCell or PSCell. Alternatively, the certain cell may be a servicing cell configured for the UE or may be a servicing cell excluding the cell in which the BFR is detected.

When the PUSCH transmission resource enabled for the MAC CE does not exist after the detection of the BFR, the UE may control to perform the transmission of step 1 (for example, PUCCH) after elapse of a certain period (for example, T0). In such a case, the UE may control to perform the transmission of step 2 (for example, MAC CE) after the transmission of step 1 is carried out.

For example, when a beam failure is detected, the UE omits the transmission of step 1 in a case that the transmission occasion of the PUSCH scheduled by the DCI or the configured grant based PUSCH is configured within the T0 period, On the other hand, in a case that the transmission occasion of the configured grant based PUSCH is not obtained within the T0 period, the transmission of step 1 (PUCCH) may be carried out to request for the configuration of the PUSCH resource for transmitting the beam failure detected cell/new candidate beam information.

Even when the PUSCH transmission resource exists after the detection of the BFR, the UE may control to perform the transmission of step 1 in a case that the PUSCH resource does not have a sufficient resource size for transmitting the MAC CE. The transmission of the MAC CE thus can be suppressed from failing.

Figure 4A:
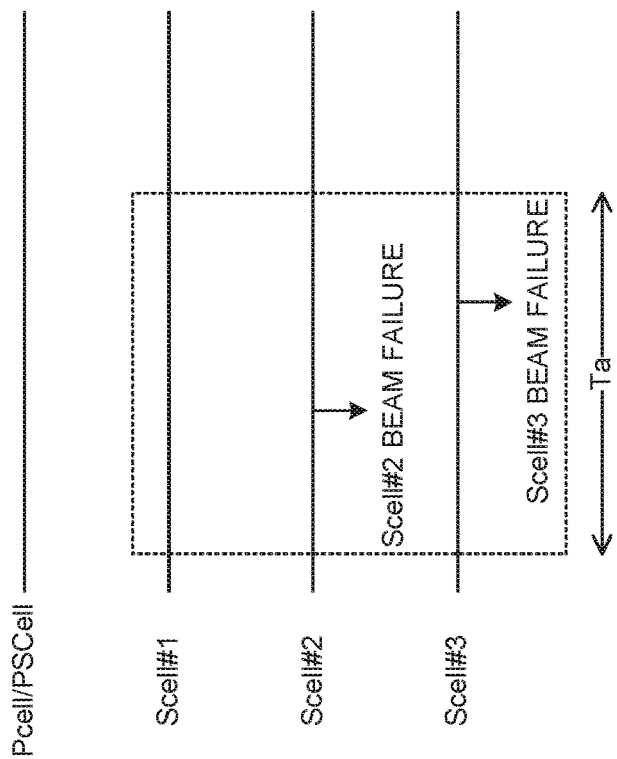
FIGS. 4A and 4B are diagrams to show an example of number of cells in which a beam failure is detected.

The number of cells to perform the BFR detection may be one or plurals. The UE may collectively perform notifying or reporting operation (for example, at least one of step 1 and step 2) with respect to the cell in which the BFR is detected within a certain period (for example, Ta). When the BFR is detected in one cell within a certain period, the UE may control to perform the reporting operation for the one cell (see FIG. 4A). In FIG. 4A, a case where only the BFR of SCell #2 is detected among a plurality of SCells #1 to #3 is shown.

Figure 4B:
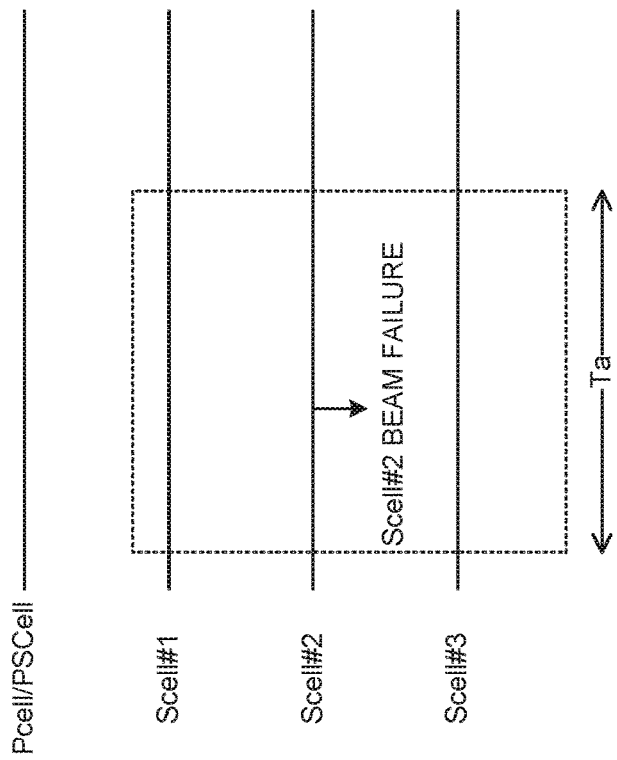

When the BFR is detected in a plurality of cells within a certain period, the UE may control to perform the reporting operation for the plurality of cells (see FIG. 4B). In FIG. 4B, a case where the BFRs of SCell #2 and SCell #3 are detected among a plurality of SCells #1 to #3 is shown. Note that an upper limit value (for example, X) of a number of plurality of cells that simultaneously perform the reporting operation may be defined in specifications or may be configured by higher layer signaling and so on for the UE from the base station. X may be a value directly indicating the number of cells or may be a value (for example, ratio) indirectly indicating the number of cells.

Thus, a part of the UE operation when there is a transmission occasion of the PUSCH can be omitted by controlling whether or not to omit step 1, based on the presence or absence of transmission occasion of the PUSCH in a certain period configured after the beam failure is detected.

<Variation>

As described above, a case where the transmission of step 2 is permitted not in the PUSCH scheduled by the DCI (step 1 trigger) transmitted from the base station due to the transmission of step 1 from the UE, but in the PUSCH that is not limited to step 1 trigger is assumed. In such a case, the UE transmits the MAC CE of step 2 by using the PUSCH scheduled or configured in a certain period (for example, T0) after detecting the beam failure.

It is also conceivable that the PUSCH transmission scheduled or configured in a certain period is configured in a cell in which the beam failure is detected. In such a case, the possibility of PUSCH transmission failure in the cell increases.

Thus, the PUSCH transmission of step 2 (for example, step 2 in a case of omitting step 1) may be configured to be performed only on at least one of PCell and PSCell. Alternatively, the PUSCH transmission of step 2 (for example, step 2 in a case of omitting step 1) may be configured to be performed on the servicing cell (or CC) other than at least the secondary cell in which the beam failure is detected.

Thus, when step 1 is omitted and step 2 is transmitted, control can be performed so as not to transmit step 2 to the cell in which the beam failure has occurred, and thus degradation of communication quality can be suppressed.

(Second Aspect)

In a second aspect, another example of the UE operation after the detection of the beam failure (BF detection) will be described. Specifically, a plurality of steps (for example, step 1 and step 2) are used after detection of the beam failure to notify the detection of the beam failure and a beam failure detected cell/new candidate beam information.

In the following description, a case where step 1 of notifying the detection of the beam failure using a PUCCH and step 2 of reporting the beam failure detected cell/new candidate beam information using a MAC CE are configured is assumed.

The time relationship between step 1 and step 2 may be configured based on a certain rule. In the following description, each of a case (option 1-1) where a period for receiving the DCI that schedules the transmission of step 2 is configured after step 1 and a case (option 1-2) where a period for performing the transmission of step 2 is configured after step 1 will be described.

<Option 1-1>

A certain time relationship may be configured between step 1 and step 2 (or DCI that schedules step 2).

For example, a certain period for receiving the DCI that schedules the step 2 (PUSCH) may be configured after step 1. In this case, the UE may be assumed to receive at least one DCI that indicates the transmission of step 2 in a certain period configured after the transmission of step 1 (for example, PUCCH). The certain period (hereinafter also referred to as T2) configured after the transmission of step 1 may also be referred to as a window, a window period, a reception window or a reception period.

Figure 5:
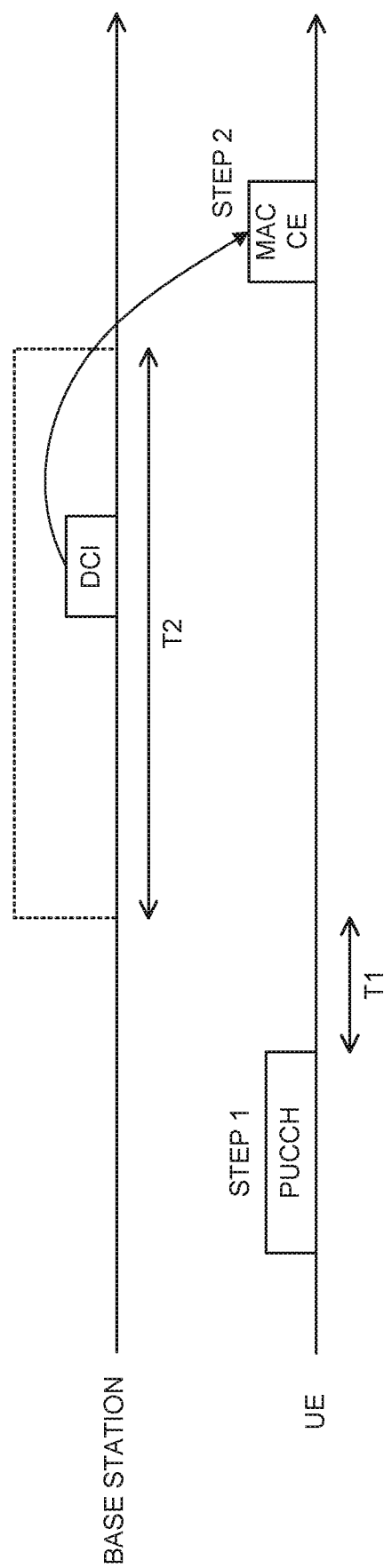
FIG. 5 is a diagram to show an example of a BFR procedure according to a second aspect.

An offset (hereinafter also referred to as T1) may be configured between step 1 and the certain period (T2) for receiving the DCI (see FIG. 5). FIG. 5 shows a case where, when detecting the BFR of a certain SCell, the UE notifies step 1 (for example, PUCCH) to the PCell or the PSCell, and then controls the receiving process (for example, monitoring) of the DCI in the T2 period configured after elapse of the T1 period.

At least one of T1 and T2 may be defined in specifications, or may be configured by higher layer signaling or the like in the UE from the base station. For example, at least one of T1 and T2 may be defined or configured in an absolute time, or may be defined or configured in a certain unit (for example, symbol or slot). At least one of T1 and T2 may be defined or configured separately (for example, with different number of symbols) for each numerology (for example, subcarrier spacing).

T1 may be a period corresponding to the processing time of the PUCCH on the network (for example, base station) side. T1 may not be defined or configured (or configured to T1=0).

The T2 period may be configured as a window period or may be controlled by a timer. When the T2 period is configured as a timer, the UE may assume to receive at least one piece of DCI (for example, UL grant) that indicates the transmission of step 2 before the timer expires. The timer corresponding to T2 may be started after the termination of the T1 period. Alternatively, the timer corresponding to T2 may be started after the start of (for example, starting symbol) or after the termination of (for example, termination symbol) step 1. In this case, T1 may not be configured or may be T1=0.

The T2 period may be applied to only the DCI that indicates the initial MAC CE transmission (initial MAC CE Tx). In this case, when the DCI for MAC CE transmission is received in the T2 period, the UE may control not to monitor the DCI for MAC CE in the remaining period.

Alternatively, the T2 period may be applied to the DCI for initial MAC CE transmission and the DCI for MAC CE retransmission. In this case, not only the DCI for initial transmission of MAC CE, but also the transmission of the DCI for retransmission are possible using the T2 period.

The DCI for step 2 (MAC CE) may be of a DCI format (for example, UL grant) that schedules the PUSCH, or may be of other formats.

A case where the UE fails to detect the DCI (for example, UL grant) in the T2 period of option 1-1 (for example, FIG. 5) is also conceivable. In such a case, the UE may retransmit the PUCCH (or step 1) after elapse of the T2 period. The UE may use at least one of the following options 1-1a to 1-1d as a retransmission control of the PUCCH.

[Option 1-1a]

Figure 6:
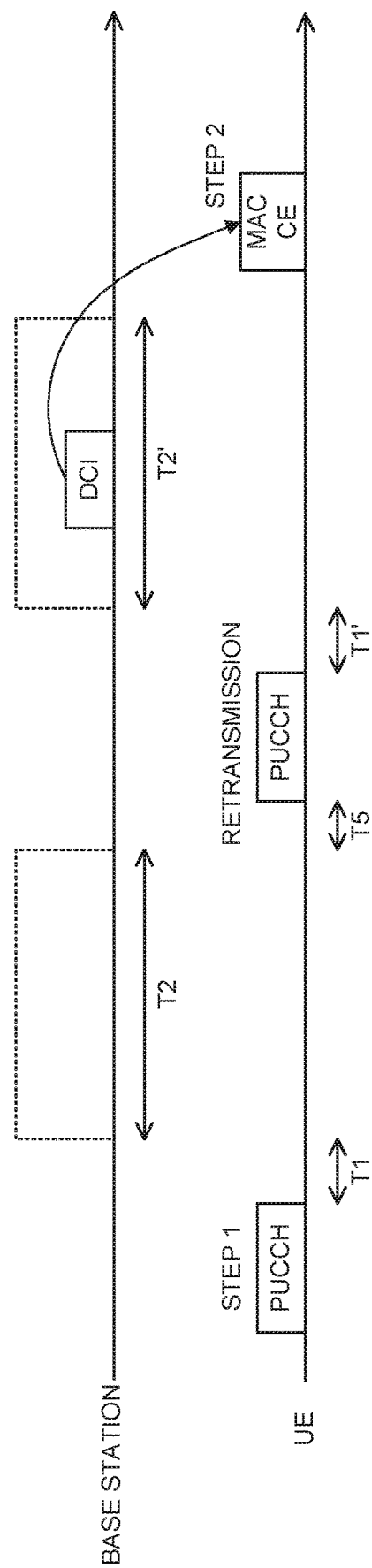
FIG. 6 is a diagram to show another example of the BFR procedure according to the second aspect.

When the DCI is failed to be detected within the T2 period, the UE may control to perform the retransmission of the PUCCH until the DCI is detected in the subsequently configured certain period (see FIG. 6). FIG. 6 shows a case where the PUCCH is retransmitted after the T2 period, and the DCI is received in a T2' period configured after the PUCCH transmission.

The certain period or time offset (for example, T5) may be configured before the PUCCH is retransmitted after the T2 period. Note that the T5 period may not be configured (or configured to T5=0).

After retransmitting the PUCCH, the UE may control the receiving process of the DCI that schedules step 2 in the period (for example, T2') configured after the certain period or time offset (for example, T1'). When the DCI is failed to be detected in the T2' period, the UE may further perform the retransmission of the PUCCH. In such a case, the UE may control the receiving process of the DCI in the period (T2") configured after the retransmission of the PUCCH.

T1' may be the same period as T1 or may not be configured (or configured to T1'=0).

T2', T2", . . . configured after the PUCCH retransmission after the T2 period may be the same period as the T2 period.

Alternatively, T2', T2", . . . may be periods longer than the T2 period or periods shorter than the T2 period.

Alternatively, T2', T2", . . . may be configured such that the periods become shorter in order (for example, T2'=T2−X, T2"=T2'−X). Alternatively, T2', T2", . . . may be configured such that the periods become longer in order (for example, T2'=T2+X, T2"=T2'+X). Note that X may be defined in specifications in advance, or may be configured by higher layer signaling or the like in the UE from the base station.

[Option 1-1b]

When the DCI is failed to be detected within the T2 period, the UE may control to perform the retransmission of the PUCCH (and DCI detection in a certain period configured after the retransmission of the PUCCH) until a maximum number of times is reached. The maximum number of times may be defined in specifications in advance, or may be configured by higher layer signaling or the like for the UE from the base station.

The UE may judge an error case when the DCI is failed to be detected even if the retransmission of the PUCCH has reached a maximum number of times. In such a case, the UE may make notification on this matter to the base station.

[Option 1-1c]

When the DCI is failed to be detected within the T2 period, the UE may control to perform the retransmission of the PUCCH (and DCI detection in a certain period configured after the retransmission of the PUCCH) before a certain timer expires.

The certain timer may be defined with respect to transmission or retransmission of step 1. The UE may control to start a certain timer when the beam failure of the SCell is detected or when the first step 1 transmission is performed. The UE may control to stop the certain timer when the DCI is detected.

[Option 1-1d]

When the DCI is failed to be detected within the T2 period, the UE may control to perform the retransmission of the PUCCH until the subsequently configured certain period no longer exists. For example, when T2', T2", . . . configured after the T2 period is configured such that the periods become shorter in order (for example, T2'=T2−X, T2"=T2'−X), the UE may control to perform the retransmission of the PUCCH and the detection process of the DCI until such period no longer exists.

[Variation]

When the DCI is failed to be detected in the T2 period, the UE may detect the DCI again without performing the retransmission of the PUCCH. For example, when the DCI is failed to be detected in the T2 period, the UE may control to perform the receiving process (for example, monitoring) of the DCI in a certain period configured after the T2 period without performing the retransmission of the PUCCH.

Thus, when the DCI is failed to be detected in the T2 period, the operation of step 2 still can be continued, even if the DCI is failed to be detected in one period, by configuring a period for supporting the detection of the DCI again.

<Option 1-2>

A certain time relationship may be configured between step 1 and step 2.

For example, a certain period for transmitting step 2 (PUSCH) may be configured after step 1. In this case, the UE may assume that the transmission occasion of step 2 is configured in a certain period configured after the transmission of step 1 (for example, PUCCH). The certain period (hereinafter also referred to as T4) configured after the transmission of step 1 may also be referred to as a window, a window period, a transmission period, a transmission chance, or a transmission occasion.

Figure 7:
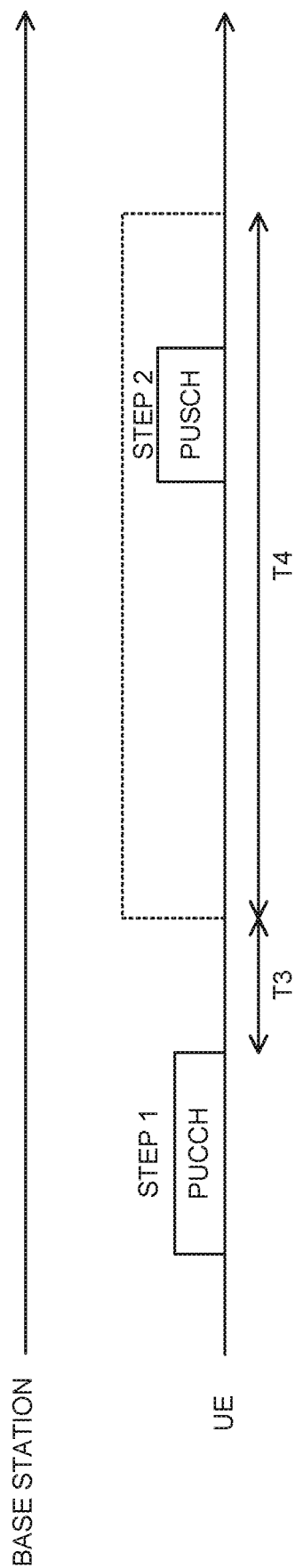
FIG. 7 is a diagram to show another example of the BFR procedure according to the second aspect.

The offset (hereinafter also referred to as T3) may be configured between step 1 and the certain period (T4 period) for transmitting the PUSCH (see FIG. 7). FIG. 7 shows a case where when detecting the BFR of a certain SCell, the UE notifies step 1 (for example, PUCCH) to the PCell or the PSCell, and then controls the transmitting process of the PUSCH in the T4 period configured after elapse of the T3 period.

The PUSCH transmission configured in the T4 period may be the PUSCH transmission scheduled by the DCI or may be the configured grant based PUSCH transmission. The DCI that schedules the PUSCH may be a certain DCI format (for example, UL grant). The transmission condition or parameter of the configured grant based PUSCH may be configured by the higher layer signaling.

At least one of T3 and T4 may be defined in specifications, or may be configured by higher layer signaling or the like in the UE from the base station. For example, at least one of T3 and T4 may be defined or configured in an absolute time, or may be defined or configured in a certain unit (for example, symbol or slot). At least one of T3 and T4 may be defined or configured separately (for example, with different number of symbols) for each numerology (for example, subcarrier spacing).

T3 may be a period corresponding to the processing time of the PUCCH on the network (for example, base station) side. T1 may not be defined or configured (or configured to T1=0).

The T4 period may be configured as a window period or may be controlled by a timer. When the T4 period is configured as a timer, the UE may assume that the transmission occasion for transmitting step 2 is configured before the timer expires. The timer corresponding to T4 may be started after the termination of the T3 period. Alternatively, the timer corresponding to T4 may be started after the start of (for example, starting symbol) or after the termination of (for example, termination symbol) step 1. In this case, T3 may not be configured or may be T3=0.

The T4 period may be applied to only the PUSCH used for the initial MAC CE transmission (initial MAC CE Tx). In this case, when the MAC CE is transmitted in the T4 period, the UE may control not to perform the transmitting operation of the MAC CE in the remaining operation.

Alternatively, the T4 period may be applied to the PUSCH for initial MAC CE transmission and the PUSCH for MAC CE retransmission. In this case, not only the PUSCH for initial transmission of the MAC CE but the transmission of the PUSCH for retransmission also are possible using the T4 period.

A case where the UE does not obtain the transmission occasion of the PUSCH (for example, the PUSCH schedule by the DCI or configured grant based transmission occasion) in the T4 period of option 1-2 (for example, FIG. 7) is also conceivable. In such a case, the UE may retransmit the PUCCH (or step 1) after elapse of the T4 period. The UE may use at least one of the following options 1-2a to 1-2d as a retransmission control of the PUCCH.

[Option 1-2a]

Figure 8:
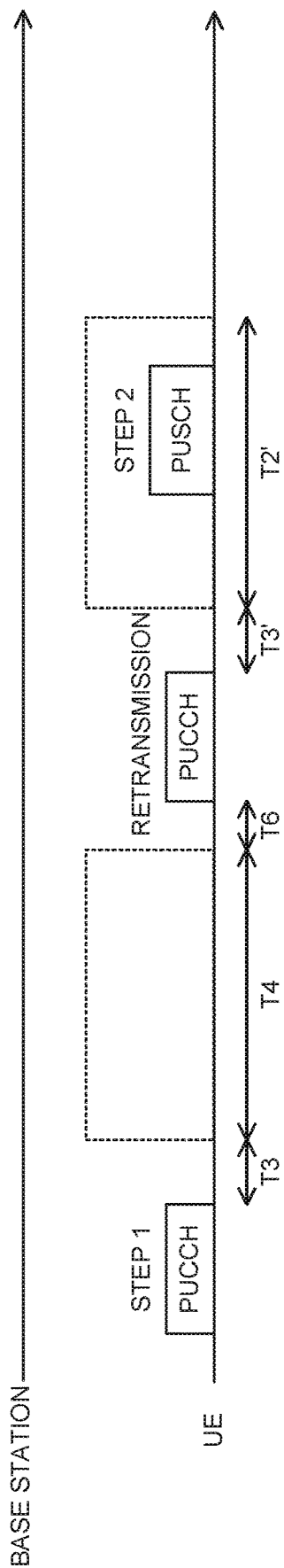
FIG. 8 is a diagram to show another example of the BFR procedure according to the second aspect.

When the transmission occasion of the PUSCH is not obtained within the T4 period, the UE may control to perform the retransmission of the PUCCH until the transmission occasion of the PUSCH is obtained in the subsequently configured certain period (see FIG. 8). FIG. 8 shows a case where the PUCCH is retransmitted after the T4 period, and the PUSCH is transmitted in the transmission occasion of the PUSCH configured in the T4' period configured after the PUCCH transmission.

The certain period or time offset (for example, T6) may be configured before the PUCCH is retransmitted after the T4 period. Note that the T6 period may not be configured (or configured to T6=0).

After retransmitting the PUCCH, the UE may control the transmitting process of the PUSCH by using the transmission occasion configured in step 2 in the period (for example, T4') configured after the certain period or time offset (for example, T3'). The UE may further retransmit the PUCCH when the transmission occasion of the PUSCH is not obtained in the T4' period. In such a case, the UE may control the transmitting process of the PUSCH in the period (T4") configured after the retransmission of the PUCCH.

T3' may be the same period as T3 or may not be configured (or configured to T3'=0).

T4', T4", . . . configured after the PUCCH retransmission after the T4 period may be the same period as the T4 period. Alternatively, T4', T4", . . . may be periods longer than the T4 period or periods shorter than the T4 period.

Alternatively, T4', T4", . . . may be configured such that the periods become shorter in order (for example, T4'=T4−X, T4"=T4'−X). T4', T4", . . . may be configured such that the periods become longer in order (for example, T4'=T4+X, T4"=T4'+X). Note that X may be defined in specifications in advance, or may be configured by higher layer signaling or the like in the UE from the base station.

[Option 1-2b]

When the transmission occasion of the PUSCH is not obtained within the T4 period, the UE may control to perform the retransmission of the PUCCH (and PUSCH transmission in a certain period configured after the retransmission of the PUCCH) until a maximum number of times is reached. The maximum number of times may be defined in specifications in advance, or may be configured by higher layer signaling or the like in the UE from the base station.

The UE may judge an error case when the transmission occasion of the PUSCH is not obtained even when the retransmission of the PUCCH has reached a maximum number of times. In such a case, the UE may make notification on this matter to the base station.

[Option 1-2c]

When the transmission occasion of the PUSCH is not obtained within the T4 period, the UE may control to perform the retransmission of the PUCCH (and PUSCH transmission in a certain period configured after the retransmission of the PUCCH) before a certain timer expires.

The certain timer may be defined with respect to transmission or retransmission of step 1. The UE may control to start a certain timer when the beam failure of the SCell is detected or when the first step 1 transmission is performed. The UE may control to stop the certain timer when the MAC CE is transmitted using the PUSCH.

[Option 1-2d]

When the transmission occasion of the PUSCH is not obtained within the T4 period, the UE may control to perform the retransmission of the PUCCH until a subsequently configured certain period no longer exists. For example, when T4', T4", . . . configured after the T2 period is configured such that the periods become shorter in order (for example, T4'=T4−X, T4"=T4'−X), the UE may control to perform the retransmission of the PUCCH and the transmitting process of the PUSCH until the period no longer exists.

[Variation]

When the transmission occasion of the PUSCH is not obtained in the T4 period, the UE may perform the transmission of the PUSCH based on the transmission occasion of the PUSCH again without performing the retransmission of the PUCCH. For example, when the transmission occasion of the PUSCH is not obtained in the T4 period, the UE may control to perform the transmitting process of the PUSCH in a certain period configured after the T2 period without performing the retransmission of the PUCCH.

Thus, when the transmission occasion of the PUSCH is not obtained in the T4 period, the operation of step 2 still can be continued even if the transmission occasion of the PUSCH is failed to be obtained in one period with a configuration in which the transmission occasion of the PUSCH is configured again.

Note that the UE may apply either one of option 1-1 and option 1-2. Alternatively, option 1-1 and option 1-2 may be applied in combination.

The first aspect and the second aspect may be applied in combination. For example, the UE that has detected a beam failure in a certain SCell transmits step 2 without performing step 1 (detection notification of the beam failure) when the transmission occasion of the PUSCH exists in a first period (for example, T0) after the beam failure is detected. At this time, the UE may transmit the MAC CE including the beam failure detected cell/new candidate beam information in the PUSCH in step 2. Note that the MAC CE may include information that notifies the detection of the beam failure.

If the transmission occasion of the PUSCH does not exist in the first period (for example, T0) after the UE has detected a beam failure, the UE performs step 1 and step 2 using the method described in the second aspect.

Thus, the UE operation when the beam failure is detected can be flexibly controlled and the UE operation can be simplified by controlling the presence or absence of step 1 according to the transmission occasion of the PUSCH.

(Third Aspect)

In a third aspect, transmission control of a PUSCH used in transmission of a MAC CE when beam failure is detected will be described. Note that the third aspect may be performed by being appropriately combined with the first aspect or the second aspect.

In step 2 performed after the beam failure detection, how to control the transmission condition or the parameter of the DCI or the PUSCH is a problem when the transmission of the MAC CE is performed using the PUSCH of which transmission is indicated by the DCI. Thus, in the third aspect, at least one of the following option 2-1 to option 2-4 is used for the PUSCH to be used in the transmission of the MAC CE (or step 2) or the DCI that controls the transmission of the PUSCH.

<Option 2-1>

In option 2-1, a configuration (for example, DCI format) of the DCI that controls the transmission of the PUSCH for the MAC CE will be described.

At least one of a format used in an existing system (for example, Rel. 15), a new format for BFR, and a new field for BFR may be applied as the DCI that controls the transmission of the PUSCH for the MAC CE. Hereinafter, a case where the DCI format used in the existing system is used (option 2-1-1), a case where the new format for BFR is used (option 2-1-2), and a case where the new field for BFR is used (option 2-1-3) in the PUSCH transmission for the MAC CE of step 2 will be described by way of example.

[Option 2-1-1]

The transmission of the PUSCH for the MAC CE may be controlled by the DCI format CRC scrambled by a certain RNTI used in the existing system. The certain RNTI may be, for example, C-RNTI. The DCI format may be at least one of DCI formats 0_0, 0_1, 1_0, and 1_1.

The UE may use any of the PUSCH scheduled by the DCI format to which a certain RNTI is applied (option 2-1-1a), the configured grant based PUSCH after the reception of the DCI format to which a certain RNTI is applied (option 2-1-1b), or the configured grant based PUSCH (option 2-1-1c).

Option 2-1-1a

Figure 9A:
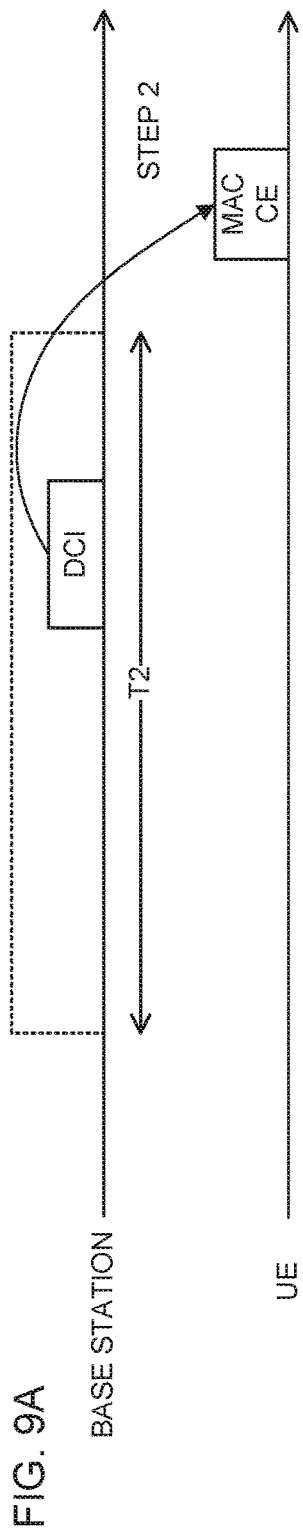
FIGS. 9A to 9C are diagrams to show an example of a BFR procedure according to a third aspect.

When the DCI format scrambled by a certain RNTI (for example, C-RNTI) is received within a certain period (for example, T2 period), the UE may transmit the MAC CE of step 2 by using the PUSCH scheduled by the DCI format (see FIG. 9A). The DCI format may be DCI format 0_0, 0_1 corresponding to the UL grant.

Option 2-1-1b

When the DCI format scrambled by a certain RNTI (for example, C-RNTI) is received and the configured grant based PUSCH transmission occasion exists, the UE may judge the DCI format as the transmitting indication of step 2. The DCI format is transmitted within the first period (for example, T2), and the configured grant based PUSCH transmission occasion may be configured within a second period (for example, T4). The first period and the second period may be partially overlapped or may be commonly configured.

Figure 9B:
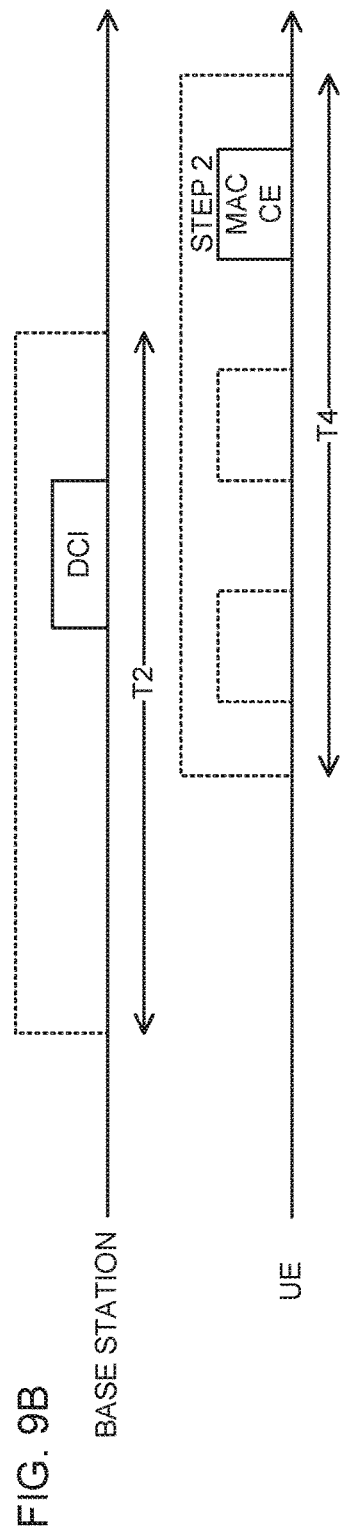

In this case, the UE may transmit the MAC CE of step 2 by using the configured grant based PUSCH after the DCI format is received (see FIG. 9B).

The DCI format may be at least one of DCI formats 0_0, 0_1, 1_0, and 1_1. When the DCI format is DCI format 0_0, 01 corresponding to the UL grant, control may be performed to transmit the MAC CE by using either one of the PUSCH scheduled by the DCI format and the configured grant based PUSCH. In this case, the UE may determine which PUSCH to apply based on a certain condition (for example, transmission timing, and so on). For example, the UE may select the PUSCH transmission having earlier transmission timing.

When the configured grant based PUSCH is not configured within a certain period (for example, T4), the UE may control the transmission of the PUSCH based on option 2-1-1a.

Option 2-1-1c

Figure 9C:
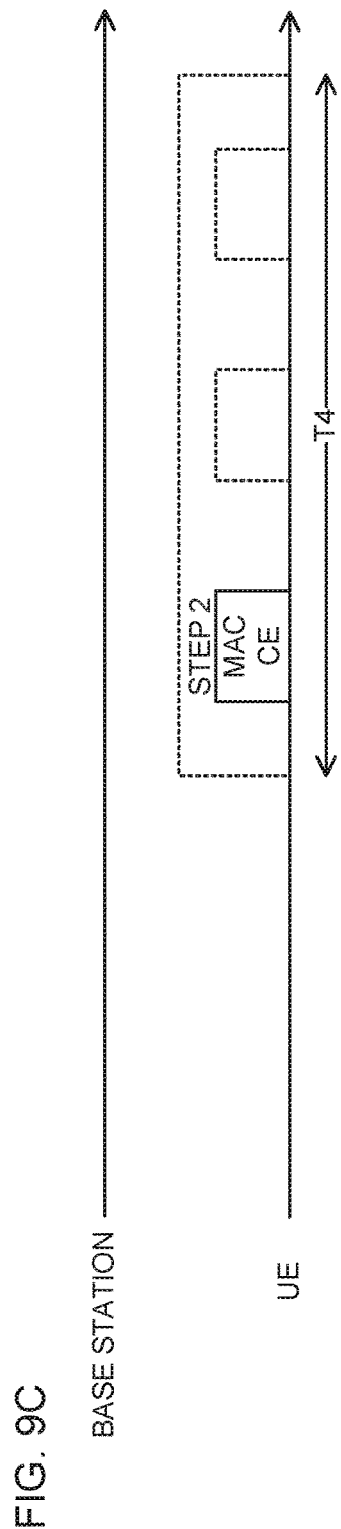

When the configured grant based PUSCH transmission occasion exists within a certain period (for example, T4), the UE may transmit the MAC CE of step 2 by using the PUSCH transmission occasion after the transmission of step 1 (see FIG. 9C).

When the configured grant based PUSCH is not configured within a certain period (for example, T4), the UE may control the transmission of the PUSCH based on option 2-1-1a.

The transmission of step 2 can be performed even when step 1 is failed to be received on the base station side by transmitting the MAC CE of step 2 using the PUSCH scheduled by the DCI CRC scrambled by the certain RNTI (for example, C-RNTI) also supported in an existing system.

For example, even when step 1 (PUCCH) transmitted from the UE is not received, the base station schedules the PUSCH in other applications in some cases. In such a case, the UE can transmit the MAC CE using the PUSCH resource configured in a certain period after transmitting step 1. The base station can recognize the beam failure in the UE based on the information included in step 2 even when step 2 is received without receiving step 1.

[Option 2-1-2]

The transmission of the PUSCH for the MAC CE may be controlled by the DCI format CRC scrambled by a new RNTI. The new RNTI may be, for example, an RNTI applied for BFR (hereinafter also referred to as a BFR-RNTI). The DCI format may be at least one of DCI formats 0_0, 0_1, 1_0, and 1_1.

The UE may use any of the PUSCH scheduled by the DCI format to which the BFR-RNTI is applied (option 2-1-2a), the configured grant based PUSCH after the reception of the DCI format to which the BFR-RNTI is applied (option 2-1-2b), or the configured grant based PUSCH (option 2-1-2c).

Option 2-1-2a

Figure 10A:
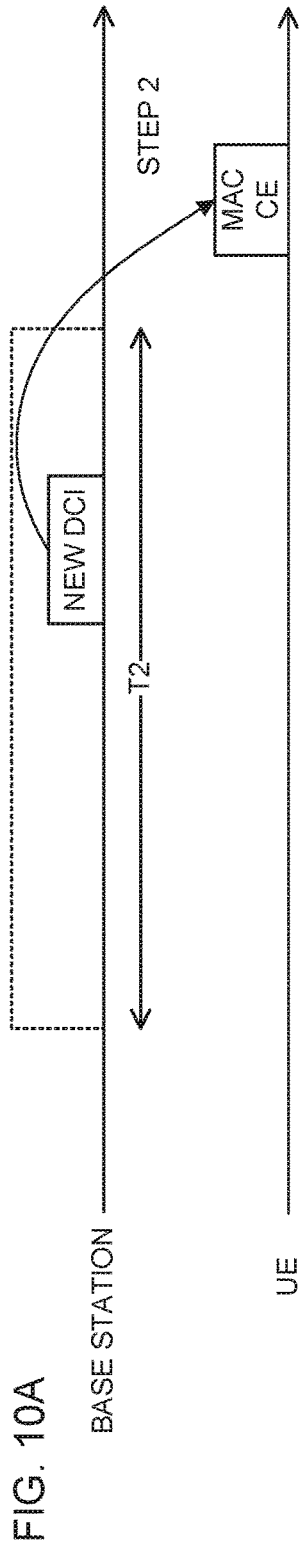
FIGS. 10A to 10C are diagrams to show another example of the BFR procedure according to the third aspect.

When the DCI format scrambled by the new RNTI (for example, BFR-RNTI) is received within a certain period (for example, T2), the UE may transmit the MAC CE of step 2 by using the PUSCH scheduled by the DCI format (see FIG. 10A). The DCI format may be DCI format 0_0, 0_1 corresponding to the UL grant.

Option 2-1-2b

When the DCI format scrambled by the new RNTI (for example, BFR-RNTI) is received and the configured grant based PUSCH transmission occasion exists, the UE may judge that the DCI format is a transmitting indication of step 2. The DCI format is transmitted within the first period (for example, T2), and the configured grant based PUSCH transmission occasion may be configured within a second period (for example, T4). The first period and the second period may be partially overlapped or may be commonly configured.

Figure 10B:
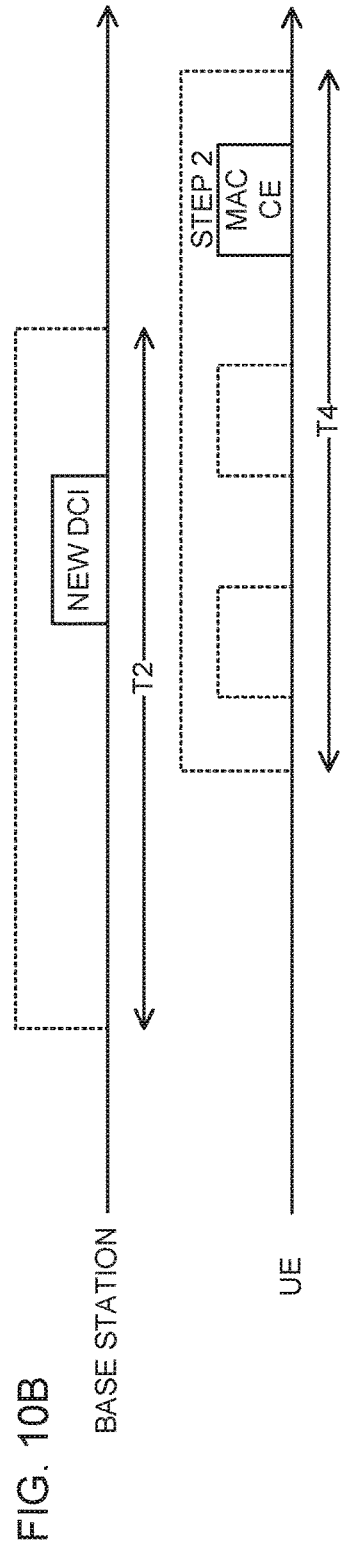

In this case, the UE may transmit the MAC CE of step 2 by using the configured grant based PUSCH after the DCI format is received (see FIG. 10B).

The DCI format may be at least one of DCI formats 0_0, 0_1, 1_0, and 1_1. When the DCI format is DCI format 0_0, 0_1 corresponding to the UL grant, control may be performed to transmit the MAC CE by using either one of the PUSCH scheduled by the DCI format and the configured grant based PUSCH. In this case, the UE may determine which PUSCH to apply based on a certain condition (for example, transmission timing, and so on). For example, the UE may select the PUSCH transmission having earlier transmission timing.

When the configured grant based PUSCH is not configured within a certain period (for example, T4), the UE may control the transmission of the PUSCH based on option 2-1-2a.

Option 2-1-2c

Figure 10C:
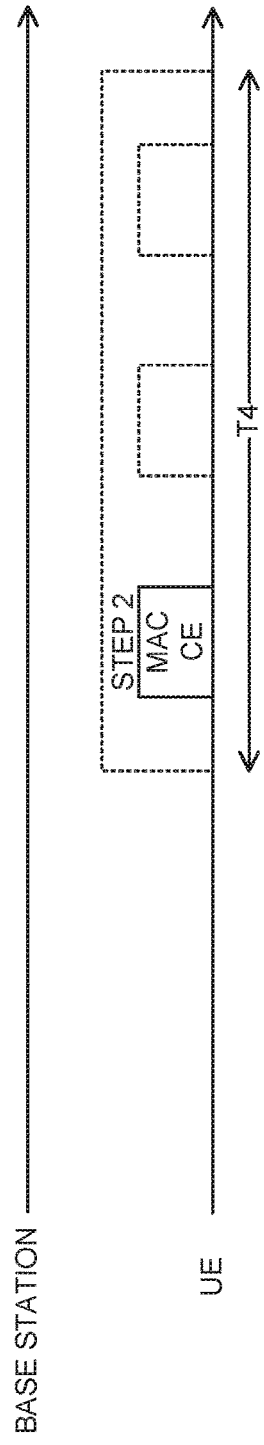

When the configured grant based PUSCH transmission occasion exists within a certain period (for example, T4), the UE may transmit the MAC CE of step 2 by using the PUSCH transmission occasion after the transmission of step 1 (see FIG. 10C).

When the configured grant based PUSCH is not configured within a certain period (for example, T4), the UE may control the transmission of the PUSCH based on option 2-1-2a.

[Option 2-1-3]

The transmission of the PUSCH for the MAC CE may be controlled by the DCI format including a new field. The new field may be, for example, a field (hereinafter also referred to as BFR reporting field) applied to the notification of the BFR reporting. The BFR reporting field may be configured with one bit or may be configured with two or more bits. The BFR reporting field may be configured to include the DCI when the BFR of a certain cell (for example, secondary cell) is configured. Thus, the bit of the DCI field can be effectively utilized.

The DCI format may be at least one of DCI formats 0_0. 0_1, 1_0, and 1_1 or a new DCI format.

The UE may use any of the PUSCH scheduled by the DCI format including the BFR reporting field (option 2-1-3a), the configured grant based PUSCH after the reception of the DCI format including the BFR reporting field (option 2-1-3b), or the configured grant based PUSCH (option 2-1-3c).

Option 2-1-3a

When the DCI format including the new field (for example, BFR reporting field) is received within a certain period (for example, T2), the UE may transmit the MAC CE of step 2 by using the PUSCH scheduled by the DCI format (see FIG. 10A). The DCI format may be DCI format 0_0 or 0_1 corresponding to the UL grant or the new DCI format.

Option 2-1-3b

When the DCI format including the new field (for example, BFR reporting field) is received and the configured grant based PUSCH transmission occasion exists, the UE may judge the DCI format as the transmitting indication of step 2. The DCI format is transmitted within the first period (for example, T2), and the configured grant based PUSCH transmission occasion may be configured within a second period (for example, T4). The first period and the second period may be partially overlapped or may be commonly configured.

In this case, the UE may transmit the MAC CE of step 2 by using the configured grant based PUSCH after the DCI format is received (see FIG. 10B).

The DCI format may be at least one of DCI formats 0_0. 0_1, 1_0, and 1_1 or a new DCI format. When the DCI format is DCI format 0_0, 0_1 corresponding to the UL grant, control may be performed to transmit the MAC CE by using either one of the PUSCH scheduled by the DCI format and the configured grant based PUSCH. In this case, the UE may determine which PUSCH to apply based on a certain condition (for example, transmission timing, and so on). For example, the UE may select the PUSCH transmission having earlier transmission timing.

When the configured grant based PUSCH is not configured within the certain period (for example, T4), the UE may control the transmission of the PUSCH based on option 2-1-3a.

Option 2-1-3c

When the configured grant based PUSCH transmission occasion exists within a certain period (for example, T4), the UE may transmit the MAC CE of step 2 by using the PUSCH transmission occasion after the transmission of step 1 (see FIG. 10C).

When the configured grant based PUSCH is not configured within the certain period (for example, T4), the UE may control the transmission of the PUSCH based on option 2-1-3a.

<Option 2-2>

In option 2-2, the size (granted size) of the PUSCH transmission for the MAC CE of step 2 will be described. Note that in the following description, a case where the PUSCH scheduled by the DCI is used as the PUSCH to use in step 2 (for example, option 1-1-1a, 1-1-2a, 1-1-3a) will be described by way of example, but this is not the sole case. It may also be applied to a case where the configured grant based PUSCH is used.

The PUSCH resource allocated by the DCI (for example, UL grant) that schedules the PUSCH of step 2 may be configured to a size capable of communicating at least the MAC CE of step 2. For example, when the payload size of the MAC CE of step 2 is A bit or byte (A-bit/byte), the size for PUSCH transmission by the DCI (or PUSCH resource) may be configured to greater than or equal to X bits or bytes ($X \geq A$).

The PUSCH resource may be at least one of a frequency resource and a time resource. Alternatively, the PUSCH resource may take into consideration a coding rate (for example, modulation coding scheme (MCS)) in addition to at least one of the frequency resource and the time resource. The MCS may be notified to the UE by the DCI.

For example, assume a case where the size of the scheduled PUSCH is smaller than the size of the MAC CE when the MAC CE is transmitted using the PUSCH scheduled by the DCI (option 1-1-1a, 1-1-2a, 1-1-3a). In such a case, the UE may judge that the DCI (for example, UL grant) is not enabled as the DCI for scheduling of step 2. The UE may control not to perform the transmission of the MAC CE using the PUSCH scheduled by the DCI.

On the other hand, when the size of the PUSCH scheduled in the DCI is larger than the size of the MAC CE, the UE may judge that the DCI (for example, UL grant) is enabled as the DCI for scheduling of step 2. In such a case, the UE may control to perform the transmission of the MAC CE using the PUSCH scheduled by the DCI.

It may be assumed that when the PUSCH is scheduled by the DCI used for BFR reporting (for example, DCI to which the BFR-RNTI is applied or DCI having the BFR reporting field) (option 1-1-2a, 1-1-3a), the UE configures the size of the PUSCH scheduled by the DCI to be larger (or not configured to be smaller) than the size of the MAC CE.

It may also be assumed that when the MAC CE is transmitted using the PUSCH configured for the configured grant base (option 1-1-1b, 1-1-1c, 1-1-2b, 1-1-2c, 1-1-3b, 1-1-3c), the UE configures the size of the PUSCH to be configured to be larger (or not to be configured to be smaller) than the size of the MAC CE.

Thus, the transmission of step 2 can be appropriately performed by controlling the size of the PUSCH (or PUSCH resource) in consideration of the size of the MAC CE.

<Option 2-3>

In option 2-3, a cell (or CC) in which the DCI that schedules the PUSCH for the MAC CE of step 2 (or DCI effective in the PUSCH transmitting indication) is transmitted will be described. Note that in the following description, a case where the PUSCH scheduled by the DCI is used as the PUSCH to use in step 2 (for example, option 1-1-1a, 1-1-2a, 1-1-3a) will be described by way of example, but this is not the sole case. It may also be applied to a case in which the configured grant based PUSCH is used (for example, DCI transmitted before the configured grant based PUSCH indicated in option 1-1-1b, 1-1-2b, 1-1-3b).

The DCI that indicates the transmission of step 2 may be controlled regarding transmission thereof through at least one method indicated in the following options 2-3-1 to 2-3-3.

Option 2-3-1

Figure 11A:
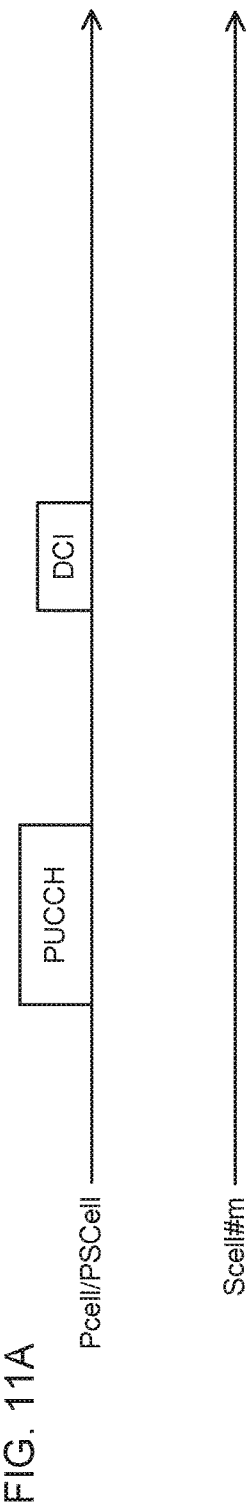
FIGS. 11A to 11C are diagrams to show another example of the BFR procedure according to the third aspect.

The DCI that indicates the transmission of step 2 may be configured to be transmitted in a certain cell. The certain cell may be at least one of PCell and PSCell. The UE may control the receiving process assuming that the DCI that indicates the transmission of step 2 is transmitted within a certain period (for example, T2) in a certain cell that transmitted the PUCCH of step 1 (or certain cell in which the PUCCH resource is configured) (see FIG. 11A).

In this case, the UE may control to selectively perform the receiving process of DCI in a certain cell, and not perform the receiving process in other cells (e.g., secondary cell). Thus, the load of the receiving process of UE can be reduced.

Note that when transmitting the MAC CE of step 2 to a certain cell (for example, PCell or PSCell), the UE that does not support the cross carrier scheduling (or UE that has not reported the support of cross carrier scheduling) may assume that the DCI that indicates the transmission of step 2 is transmitted with a certain cell.

Option 2-3-2

The DCI that indicates the transmission of step 2 may be configured to be transmitted in any of the servicing cells to which the UE is connected. The servicing cell may be at least one of PCell, PSCell, SCell included in the same group as the PCell, and the SCell included in the same group as the PSCell. The UE may control the receiving process assuming that the DCI that indicates the transmission of step 2 is transmitted within a certain period (for example, T2) in a certain cell that transmitted the PUCCH of step 1 (or certain cell in which the PUCCH resource is configured) or the SCell included in the same cell group as the certain cell (see FIG. 11B).

Figure 11B:
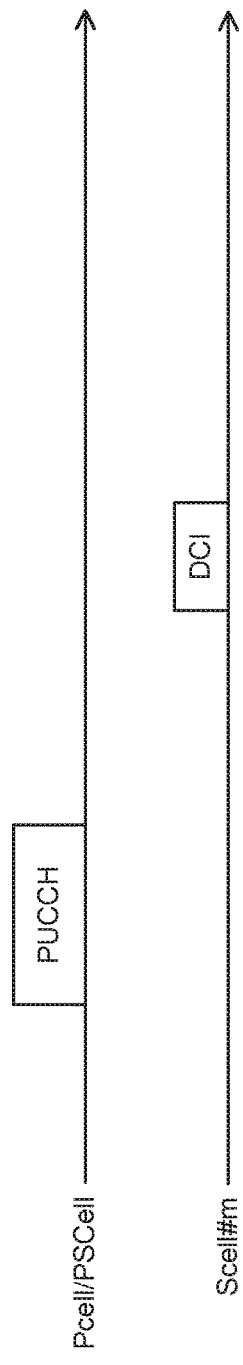

FIG. 11B shows a case where the UE transmits the PUCCH of step 1 to PCell or PSell, and detects the DCI in the SCell #m included in the same group as the PCell or the PSCell. In this case, a cell that performs the transmission of the DCI that indicates the transmission of message 2 can be flexibly configured.

Option 2-3-3

The DCI that indicates the transmission of step 2 may be configured to be transmitted in any cell excluding the cell in which the BFR is detected among the servicing cells to which the UE is connected. The servicing cell may be at least one of PCell, PSCell, SCell included in the same group as the PCell, and the SCell included in the same group as the PSCell. The UE may control the receiving process assuming that the DCI that indicates the transmission of step 2 is transmitted within a certain period (for example, T2) in a certain cell that transmitted the PUCCH of step 1 (or certain cell in which the PUCCH resource is configured) or the SCell included in the same cell group as the certain cell (excluding the BFR detected cell) (see FIG. 11C).

Figure 11C:
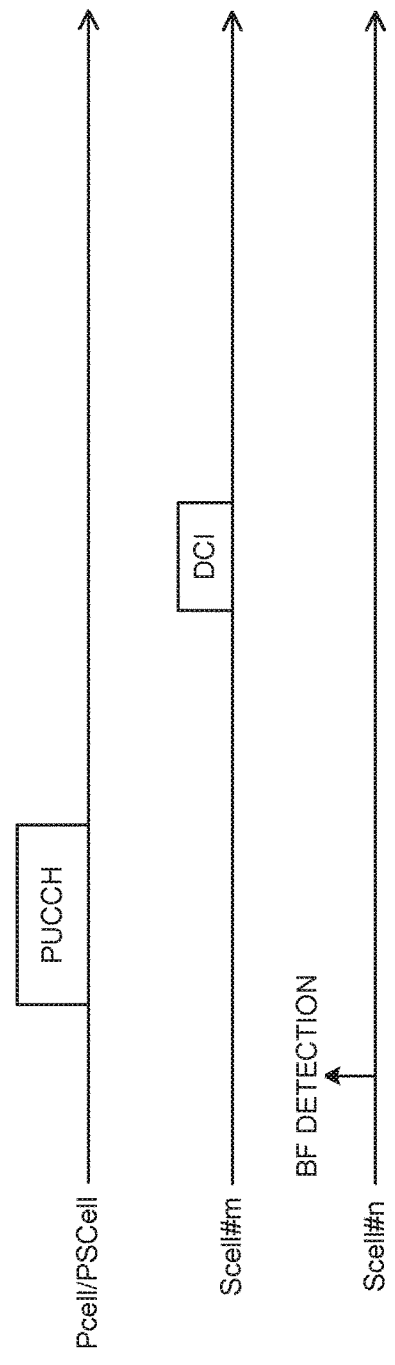

FIG. 11C shows a case where the UE transmits the PUCCH of step 1 to PCell or PSell, and detects the DCI in the SCell #m included in the same group as the PCell or the PSCell. Thus, a cell that performs the transmission of the DCI that indicates the transmission of message 2 can be flexibly configured and the reception of the DCI in the UE can be appropriately performed by controlling so that transmission of the DCI is not performed in the cell in which the BFR is detected.

Option 2-3-4

In addition to the options 2-3-1 to 2-3-3, the DCI that indicates the transmission of the MAC CE of step 2 (or DCI to be enabled) may be further limited based on a cell in which the PUSCH used for the transmission of the MAC CE is scheduled.

For example, when transmitting the MAC CE of step 2 to a certain cell (for example, PCell or PSCell), the UE that does not support the cross carrier scheduling (or UE that has not reported the support of cross carrier scheduling) may assume that the DCI that indicates the transmission of step 2 is transmitted with a certain cell.

The UE may assume that the PUSCH scheduled for the transmission of the MAC CE of step 2 is not transmitted in the cell in which the BFR is detected. For example, the cell in which the transmission of the PUSCH is scheduled by the DCI may be controlled to be a cell other than the cell in which the BFR is detected.

<Option 2-4>

In option 2-4, the UE operation when the DCI that schedules the PUSCH for the MAC CE of step 2 or the PUSCH is transmitted plural times in a certain period will be described.

In the following description, a case where the DCI is transmitted in a plurality of cells (for example, PCell and SCell) will be described, but control may be similarly performed even when a plurality of DCIs are transmitted in one cell.

In the following description, a case where the PUSCH scheduled by the DCI is used as the PUSCH to use for step 2 (for example, option 1-1-1a, 1-1-2a, 1-1-3a) will be described by way of example, but this is not the sole case. It may also be applied to a case in which the configured grant based PUSCH is used (for example, DCI transmitted before the configured grant based PUSCH indicated in option 1-1-1b, 1-1-2b, 1-1-3b).

[Option 2-4-1]

In option 2-4-1, the UE operation when a plurality of DCIs that schedule the PUSCH that can be used in the transmission of the MAC CE of step 2 are transmitted in a certain period (for example, T2) will be described.

When the DCI format that indicates the transmission of step 2 is a certain DCI format, and the UE detects a plurality of certain DCI formats within a certain period (for example, T2), control may be performed to transmit the MAC CE using the PUSCH scheduled by the DCI format selected based on a certain condition.

The certain DCI format may be DCI format 0_0 or 0_1. The certain DCI format may be scrambled by a certain RNTI (for example, C-RNTI). The certain condition may be at least one of the cell index and the transmission timing.

For example, when detecting a plurality of DCIs that schedule the PUSCH in one cell (for example, PCell) in a certain period, the UE may transmit the MAC CE using the PUSCH scheduled by the DCI detected first.

When detecting a plurality of DCIs that schedule the PUSCH in a plurality of cells (for example, PCell and SCell) in a certain period, the UE may transmit the MAC CE using the PUSCH scheduled by the DCI detected first in a cell having the smallest (or largest) index (see FIG. 12A). In other words, the UE first checks the cell index (prioritizes the cell index), and then checks the detection timing of the DCI.

FIG. 12A shows a case where the MAC CE is transmitted using the PUSCH scheduled by the DCI detected first in the PCell having a smaller cell index than the SCell.

Alternatively, when detecting a plurality of DCIs that schedule the PUSCH in a plurality of cells (for example, PCell and SCell) in a certain period, the UE may transmit the MAC CE using the PUSCH scheduled by the detected DCI in a cell having the smallest (or largest) call index among the DCIs detected first (see FIG. 12B). In other words, the UE first checks the detection timing of the DCI (prioritizes the detection timing), and then checks the cell index.

FIG. 12B shows a case where the MAC CE is transmitted using the PUSCH scheduled by the DCI detected first in a plurality of cells. Thus, the PUSCH can be transmitted at an early timing, so that delay of the BFR procedure can be suppressed.

The UE may transmit the MAC CE using the PUSCH scheduled by the DCI detected in any of the servicing cells (for example, DCI format 0_0 or 0_1 scrambled by C-RNTI) in a certain period. In other words, the PUSCH to use in the transmission of the MAC CE may be determined regardless of the type of DCI detected in a certain period and the cell type.

Note that the UE may assume that when MAC transmission using the PUSCH scheduled by a certain DCI transmitted in a certain period is not performed, at least one DCI that schedules the PUSCH is transmitted in the remaining period of the certain period.

[Option 2-4-2]

In option 2-4-2, the UE operation when a plurality of transmission occasions of the PUSCH that can be used in the transmission of the MAC CE of step 2 are configured in a certain period (for example, T4) will be described.

When the DCI format that indicates the transmission of step 2 is a certain DCI format, and the UE detects a plurality of transmission occasions of the PUSCH that can be used in the transmission of the MAC CE (or PUSCH resource 0) within a certain period (for example, T4), control may be made to transmit the MAC CE using the PUSCH transmission occasion selected based on a certain condition.

The certain DCI format may be DCI format 0_0 or 0_1. The certain DCI format may be scrambled by the certain RNTI (for example, C-RNTI). The certain condition may be at least one of the cell index and the transmission timing.

For example, when a plurality of PUSCH transmission occasions are obtained in one cell (for example, PCell) in a certain period, the UE may transmit the MAC CE using the PUSCH transmission occasion configured first.

When a plurality of PUSCH transmission occasions are obtained in a plurality of cells (for example, PCell and SCell) in a certain period, the UE may transmit the MAC CE using the PUSCH transmission occasion configured first in a cell having the smallest (or largest) index (see FIG. 13A). In other words, the UE first checks the cell index (prioritizes the cell index), and then checks the detection timing of the DCI.

FIG. 13A shows a case where the MAC CE is transmitted using the PUSCH transmission occasion configured first in the PCell having a smaller cell index than the SCell.

Alternatively, when a plurality of PUSCH transmission occasions are obtained in a plurality of cells (for example, PCell and SCell) in a certain period, the UE may transmit the MAC CE using the PUSCH transmission occasion configured in a cell having the smallest (or largest) cell index among the PUSCH transmission occasions configured first (see FIG. 13B). In other words, the UE first checks the configuration timing of the PUSCH (prioritizes the configuration timing) and then checks the cell index.

FIG. 13B shows a case where the MAC CE is transmitted using the PUSCH transmission occasion configured first in a plurality of cells. Thus, the PUSCH can be transmitted at an early timing, so that delay of the BFR procedure can be suppressed.

The UE may transmit the MAC CE using the PUSCH transmission occasion configured in any one of the serving cells in a certain period. In other words, the PUSCH to use in the transmission of the MAC CE may be determined regardless of the type of PUSCH obtained in a certain period and the cell type.

Note that the UE may assume that when the MAC transmission using a configured certain PUSCH transmission occasion is not performed in a certain period, at least one PUSCH transmission occasion is configured in the remaining period of the certain period.

[Option 2-4-3]

In option 2-4-3, the UE operation when each of the DCI (normal DCI) that schedules the PUSCH and the DCI (new DCI) configured for the transmission indication of the MAC CE of step 2 are transmitted in a certain period (for example, T2) will be described. The new DCI may be the DCI to which the BFR-RNTI or the BFR reporting field is applied, and the normal DCI may be the DCI to which the RNTI other than the BFR-RNTI (for example, C-RNTI) and the BFR reporting field are not applied.

When the UE detects the normal DCI that schedules the PUSCH and the new DCI within a certain period (for example, T2), the UE may control to transmit the MAC CE using the PUSCH scheduled by the new DCI.

Figure 14A:
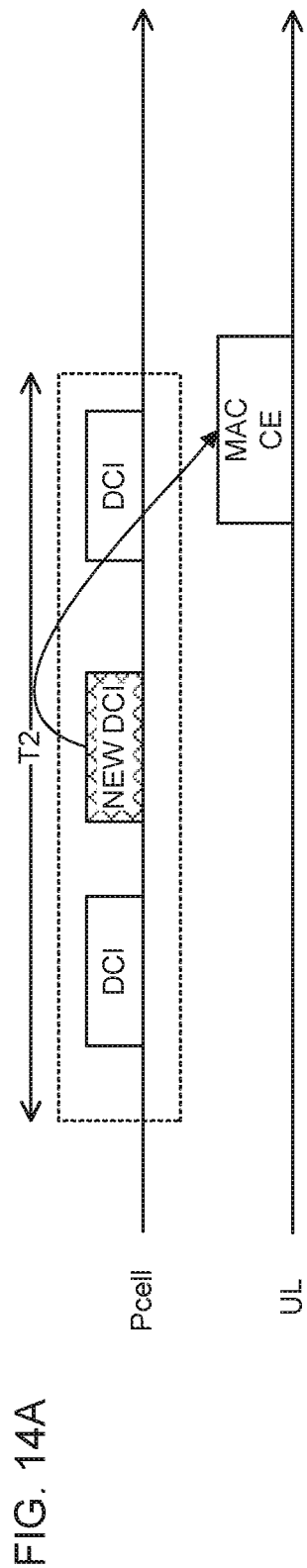
FIGS. 14A and 14B are diagrams to show another example of the BFR procedure according to the third aspect.
Figure 14B:
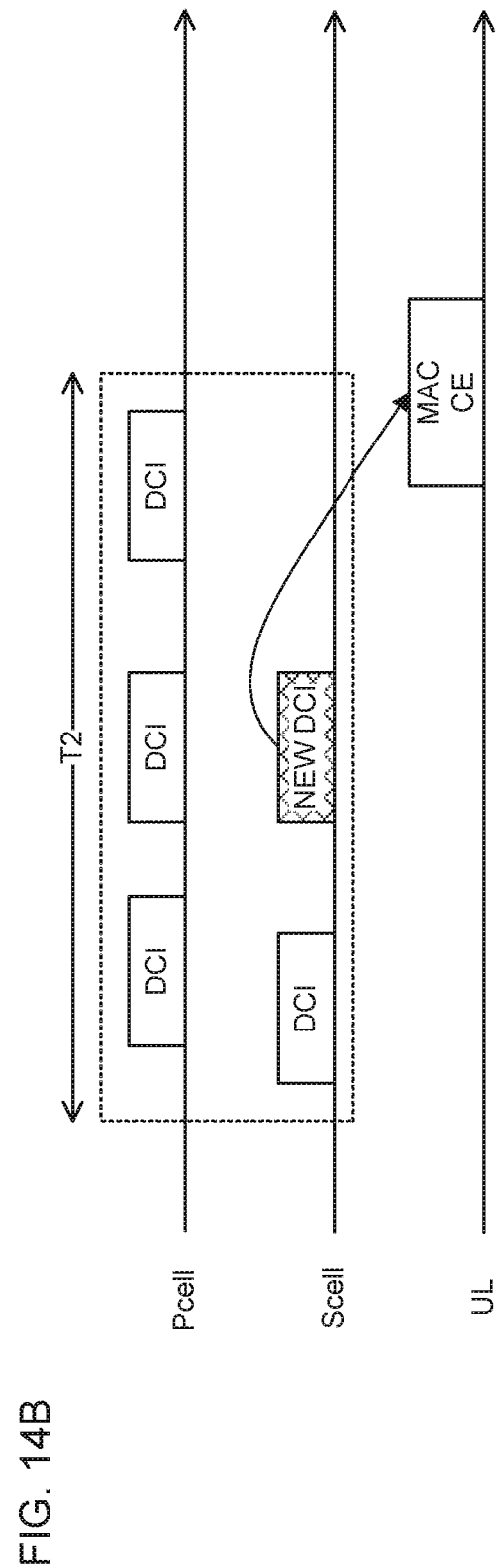

For example, when detecting the normal DCI and the new DCI in one cell (for example, PCell) in a certain period, the UE may transmit the MAC CE by using the PUSCH scheduled by the new DCI (see FIG. 14A). Alternatively, when the normal DCI and the new DCI are detected in a plurality of cells (for example, PCell and SCell) in a certain period, the MAC CE may be transmitted using the PUSCH scheduled by the new DCI (see FIG. 14B).

Note that the new DCI may be configured so that only a maximum of one new DCI is transmitted in a certain period. The UE may control the receiving process assuming only one new DCI is received in a certain period.

When the PUSCH transmission scheduled by the new DCI cannot be received, the base station may perform the retransmission of the PUSCH in the new DCI or in the existing DCI.

When detecting a plurality of new DCIs in a plurality of cells in a certain period, the UE may transmit the MAC CE by using the PUSCH scheduled by the new DCI detected first in a cell having the smallest (or largest) index. In other words, the UE first checks the cell index (prioritizes the cell index) and then checks the detection timing of the new DCI.

Alternatively, when detecting a plurality of new DCIs in a plurality of cells in a certain period, the UE may transmit the MAC CE by using the PUSCH scheduled by the new DCI detected in a cell having the smallest (or largest) index among the new DCIs detected first. In other words, the UE first checks the detection timing of the DCI (prioritizes the detection timing), and then checks the cell index.

Alternatively, when a plurality of PUSCH transmission occasions are scheduled by the new DCI in a plurality of cells in a certain period, the UE may transmit the MAC CE by using the PUSCH transmission occasion configured first in a cell having the smallest (or largest) index. In other words, the UE first checks the cell index (prioritizes the cell index), and then checks the detection timing of the DCI.

Alternatively, when a plurality of PUSCH transmission occasions are scheduled by the new DCI in a plurality of cells in a certain period, the UE may transmit the MAC CE using the PUSCH transmission occasion configured in a cell having the smallest (or largest) cell index among the PUSCH transmission occasions configured first. In other words, the UE first checks the configuration timing of the PUSCH (prioritizes the configuration timing) and then checks the cell index.

(Variation)

When performing the transmission of the MAC CE of step 2 using the PUSCH, a case where HARQ-ACK for the PUSCH transmission is not fed back from the base station is also assumed. In such a case, how the UE judges success or fail of the PUSCH transmission of step 2 is a problem. The control may be performed in the following manner to solve such a problem.

When the base station receives (or detects) step 1, the base station schedules the PUSCH for step 2. Thus, when the PUSCH transmitted from the UE is not correctly received, the base station may control to transmit again the transmitting indication (for example, UL grant) of the PUSCH to cause the UE to retransmit the PUSCH (step 2).

When the base station does not receive (or detect) step 1, the base station does not perform the transmission of the DCI (for example, UL grant) with the intention of scheduling the PUSCH for step 2. In other words, a case where the UE performs the transmission of step 2 based not on the DCI transmitted with an intention of PUSCH transmission of step 2 but on the DCI transmitted for other purposes (for example, judging such DCI as a DCI issued for step 2) is also considered.

When the base station misses the reception of the PUSCH transmitted with an intention of step 2 by the UE, how to control the retransmission of the PUSCH is a problem. In this case, the retransmission of the PUSCH can be indicated on the base station side (for example, implementation matter of the base station) but it is also conceivable to configure an upper limit for the number of retransmissions of the PUSCH or to not appropriately allocate the PUSCH resource for retransmission depending on the retransmission control. Therefore, the UE (and the base station) may apply operation 1 or operation 2 below.

<Operation 1>

The UE may control to perform again from the scheduling request of the PUSCH at the transmission timing of the next scheduling request (SR). The utilization efficiency of resources can be enhanced by utilizing the scheduling request.

<Operation 2>

The UE may control to transmit step 2 at the next PUSCH transmission timing. Thus, the UE can perform the transmission of step 2 (MAC CE) using all available PUSCHs until a certain timer expires or the BFR response (for example, S105 of FIG. 1) arrives, and thus the delay of the BFR can be suppressed and the reliability can be enhanced.

Note that when operation 1 is applied, the configuration of the BFR response (for example, S105 of FIG. 1) from the base station may be unnecessary. When operation 2 is applied, the BFR response or a certain timer may be configured.

The UE in which the TCI state (TCI state) is newly configured, updated or activated may assume that the BFR procedure is completed in place of the BFR response. In such a case, the BFR response may be unnecessary. The TCI state that is newly configured, updated or activated may be limited to a secondary cell in which the beam failure is detected or may be performed in at least one of the serving cells.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 15:
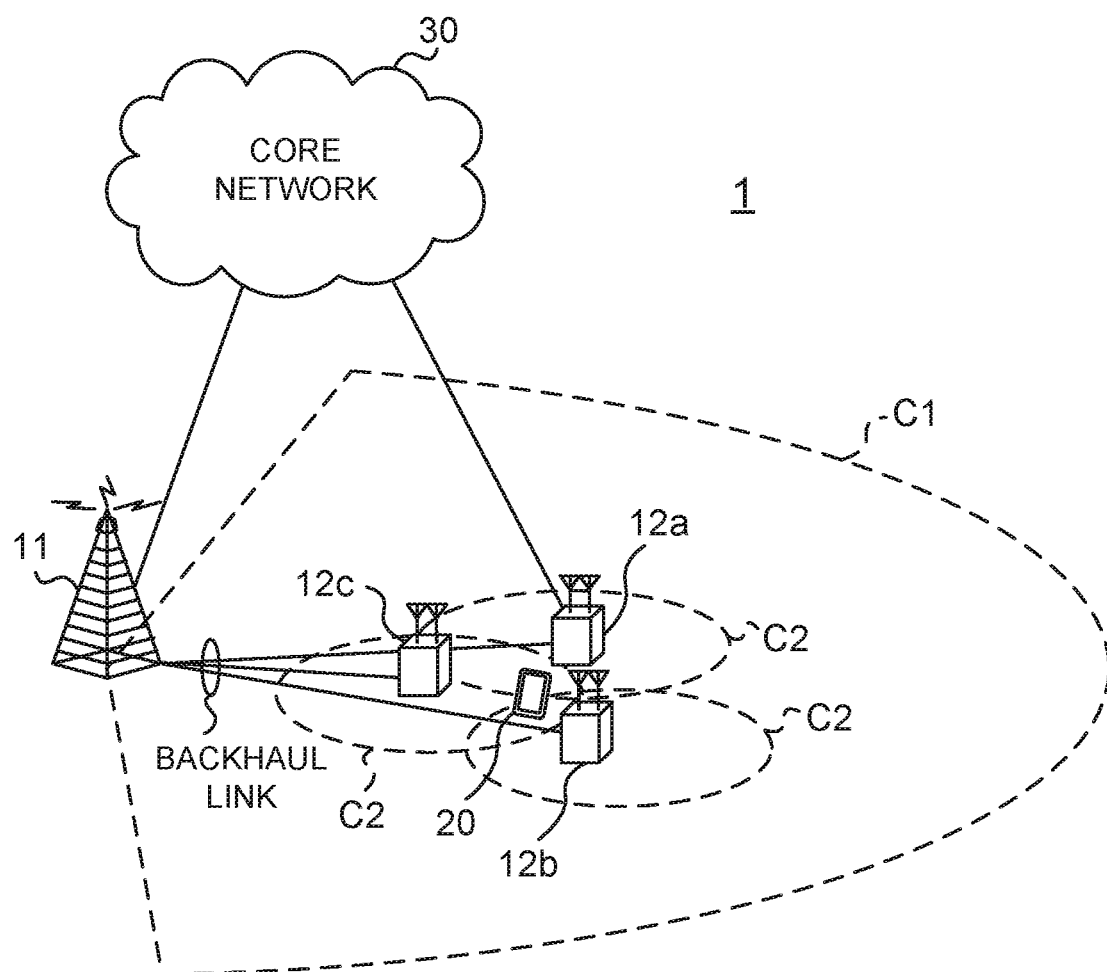
FIG. 15 is a diagram to show an example of a schematic structure of a radio communication system according to one embodiment.

FIG. 15 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 16:
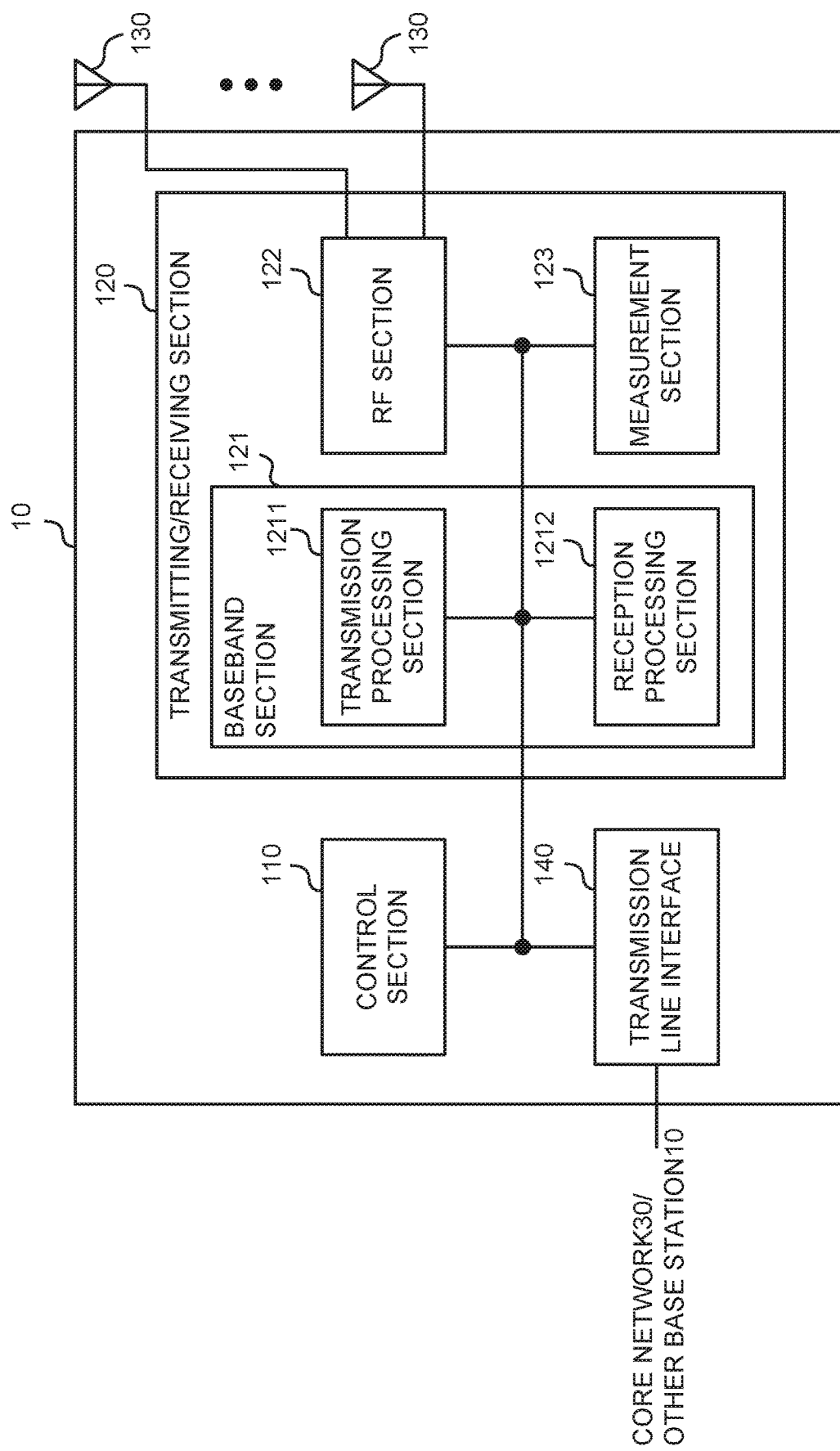
FIG. 16 is a diagram showing an example of a structure of a base station according to one embodiment.

FIG. 16 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may receive first information that notifies the occurrence of beam failure and second information related to at least one of the cell in which the beam failure is detected and the new candidate beam. The transmitting/receiving section 120 may perform at least one of transmission of downlink control information that indicates the transmission of the second information and reception of the second information in a period configured after transmitting the first information.

The transmitting/receiving section 120 may transmit the downlink control information using at least one of a specific RNTI (Radio Network Temporary Identifier) and a specific field. The specific RNTI may, for example, be at least one of the C-RNTI and the BFR-RNTI. This is, of course, not the sole case, and other RNTI may be employed. The transmitting/receiving section 120 may transmit the downlink control information in the cell in which the occurrence of beam failure is notified or a secondary cell included in a cell group same as the cell in which the occurrence of beam failure is notified.

The control section 110 may control to perform at least one of the transmission of the downlink control information that indicates the transmission of the second information and the reception of the second information in a period configured after transmitting the first information.

When detecting a beam failure, the control section 110 may control the reception of information related to at least one of the cell in which the beam failure is detected and the new candidate beam by at least one of an uplink shared channel scheduled by the downlink control information and a configured grant based uplink shared channel configured after receiving the downlink control information.

(User Terminal)

Figure 17:
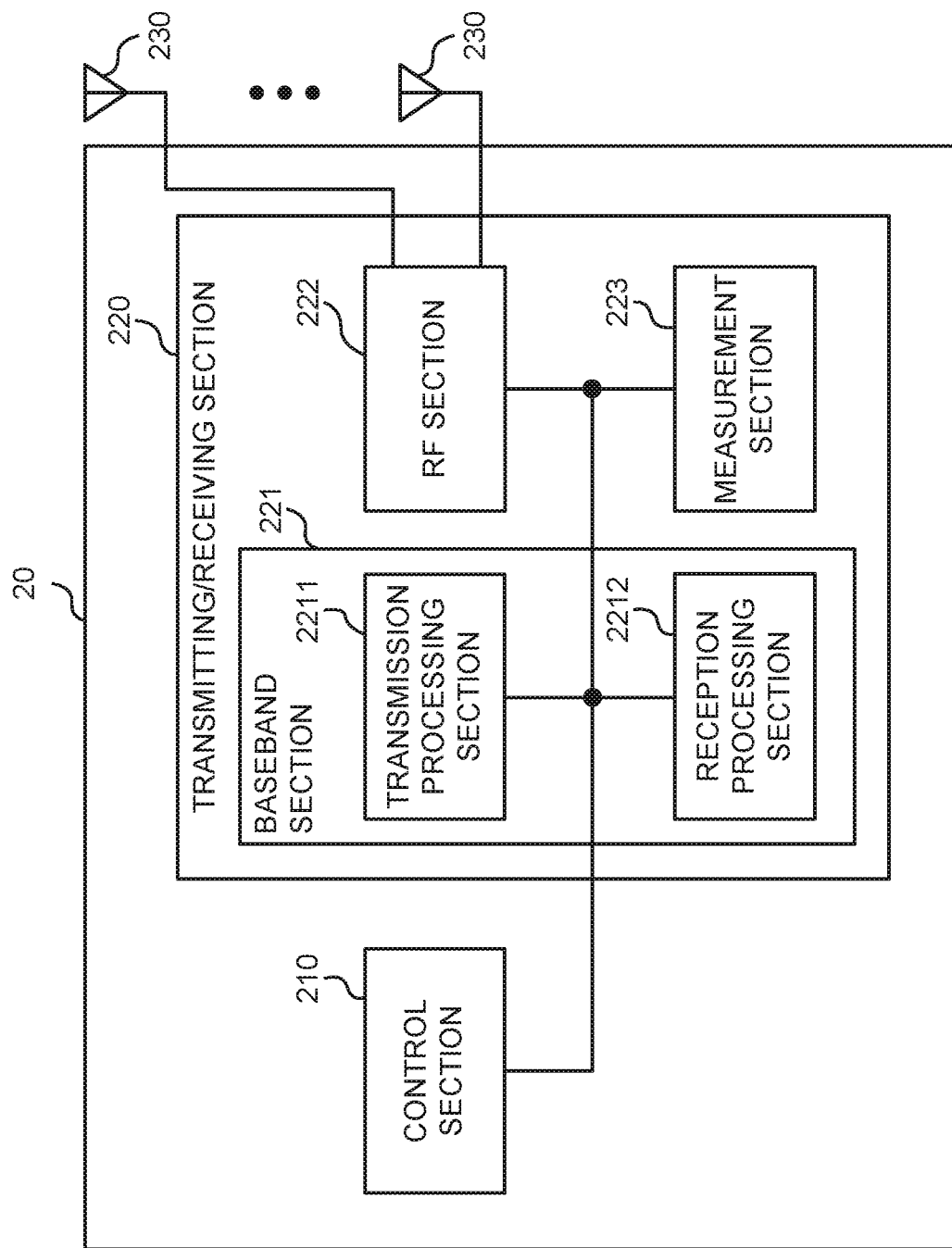
FIG. 17 is a diagram to show an example of a structure of a user terminal according to one embodiment.

FIG. 17 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may transmit first information that notifies the occurrence of beam failure and second information related to at least one of the cell in which the beam failure is detected and the new candidate beam. The transmitting/receiving section 220 may perform at least one of reception of downlink control information that indicates the transmission of the second information and transmission of the second information in a period configured after transmitting the first information.

The transmitting/receiving section 220, may receive the downlink control information using at least one of a specific RNTI (Radio Network Temporary Identifier) and a specific field. The specific RNTI may, for example, be at least one of the C-RNTI and the BFR-RNTI. This is, of course, not the sole case, and other RNTI may be employed. The transmitting/receiving section 220 may receive the downlink control information in the cell in which the occurrence of beam failure is notified or a secondary cell included in a cell group same as the cell in which the occurrence of beam failure is notified.

The control section 210 may control to perform at least one of the reception of the downlink control information that indicates the transmission of the second information and the transmission of the second information in a period configured after transmitting the first information. When the downlink control information that indicates the transmission of the second information is not received in the period configured after transmitting the first information, the control section 210 may control to retransmit the first information. When there is no transmission occasion of the second information in the period configured after transmitting the first information, the control section 210 may control to retransmit the first information. When a transmission occasion of the uplink shared channel exists within a certain period after detecting the beam failure, the control section 210 may control to perform the transmission of the second information without performing the transmission of the first information. The control section 210 may control to perform the transmission of the second information by using at least one of the uplink shared channel scheduled by the downlink control information and the configured grant based uplink shared channel.

When detecting a beam failure, the control section 210 may control the transmission of information related to at least one of the cell in which the beam failure is detected and the new candidate beam using at least one of the uplink shared channel scheduled by the downlink control information and the configured grant based uplink shared channel configured after receiving the downlink control information. The control section 201 may control to receive the downlink control information in the cell in which the occurrence of beam failure is notified or a secondary cell included in a cell group same as the cell in which the occurrence of beam failure is notified. When a plurality of pieces of downlink control information are received in a period configured after the beam failure is detected or in a period configured after the occurrence of the beam failure is notified, the control section 201 may control the transmission of information by using the uplink shared channel corresponding to the downlink control information selected based on at least one of the cell index and the transmission timing corresponding to each piece of downlink control information. When a plurality of transmission occasions of the uplink shared channel exist in a period configured after the beam failure is detected or in a period configured after the occurrence of the beam failure is notified, the control section 201 may determine the uplink shared channel to use for the transmission of information based on at least one of the cell index and the transmission timing corresponding to each uplink shared channel.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 18:
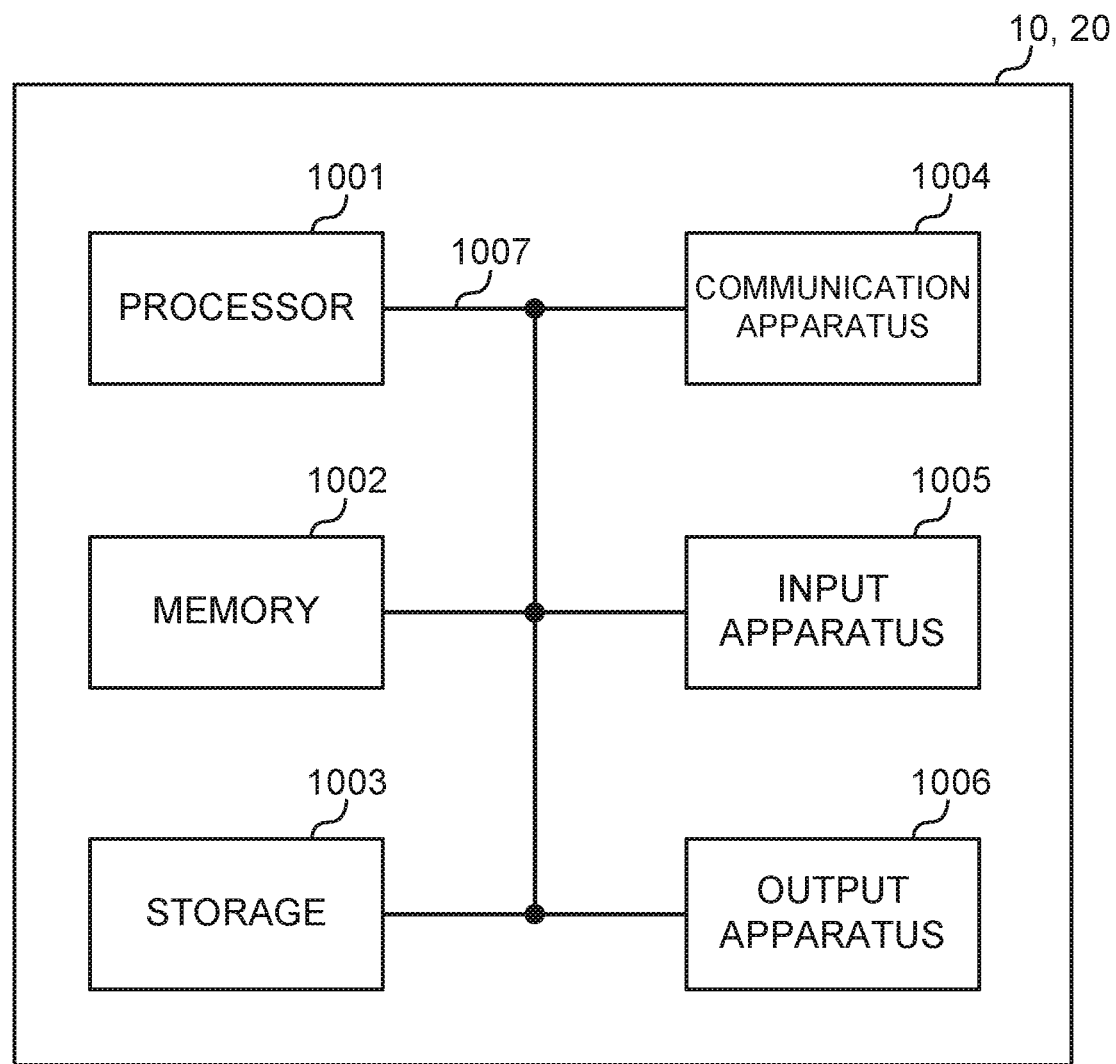
FIG. 18 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 18 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signal" may be "message". A reference signal may be abbreviated as an "RS," and may be referred to as a "pilot," a "pilot signal," and so on, depending the applied standard. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be notified using, for example, MAC control elements (MAC CEs).

Also, notification of certain information (for example, notification of "X holds") does not necessarily have to be notified explicitly, and can be notified implicitly (by, for example, not notifying this certain information or notifying another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a transmitter that, when an uplink shared channel resource having a resource size sufficient for transmission of a medium access control (MAC) control element for beam failure recovery (BFR) does not exist after detection of beam failure in a secondary cell, performs a first operation of transmitting a scheduling request (SR); and
    a processor that, when the uplink shared channel resource having a resource size sufficient for transmission of the MAC control element for the BFR exists, controls to omit the first operation and to perform a second operation of transmitting the MAC control element for the BFR by using the uplink shared channel resource,
    wherein when beam failure is detected in a plurality of secondary cells, the processor controls to collectively perform the second operation in the plurality of secondary cells, and
    an upper limit value of the number of the plurality of secondary cells reported by the MAC control element for the BFR is configured based on higher layer signaling.

2. The terminal according to claim 1, wherein the transmitter performs the first operation in a primary cell and performs the second operation in a cell other than the secondary cell in which beam failure is detected.

3. The terminal according to claim 2, wherein the MAC control element for the BFR includes information about an index of the secondary cell in which beam failure is detected and information about an index of a reference signal indicating a candidate beam.

4. The terminal according to claim 1, wherein the MAC control element for the BFR includes information about an index of the secondary cell in which beam failure is detected and information about an index of a reference signal indicating a candidate beam.

5. A radio communication method for a terminal, comprising:
    when an uplink shared channel resource having a resource size sufficient for transmission of a medium access control (MAC) control element for beam failure recovery (BFR) does not exist after detection of beam failure in a secondary cell, performing a first operation of transmitting a scheduling request (SR); and
    when the uplink shared channel resource having a resource size sufficient for transmission of the MAC control element for the BFR exists, controlling to omit the first operation and to perform a second operation of transmitting the MAC control element for the BFR by using the uplink shared channel resource,
    wherein when beam failure is detected in a plurality of secondary cells, the terminal collectively performs the second operation in the plurality of secondary cells, and
    an upper limit value of the number of the plurality of secondary cells reported by the MAC control element for the BFR is configured based on higher layer signaling.

6. A system comprising a terminal and a base station, wherein
    the terminal comprises:
        a transmitter that, when an uplink shared channel resource having a resource size sufficient for transmission of a medium access control (MAC) control element for beam failure recovery (BFR) does not exist after detection of beam failure in a secondary cell, performs a first operation of transmitting a scheduling request (SR); and
        a processor that, when the uplink shared channel resource having a resource size sufficient for transmission of the MAC control element for the BFR exists, controls to omit the first operation and to perform a second operation of transmitting the MAC control element for the BFR by using the uplink shared channel resource, and the base station comprises:
  a receiver that receives at least one of the SR and the MAC control element for the BFR,
  wherein when beam failure is detected in a plurality of secondary cells, the processor controls to collectively perform the second operation in the plurality of secondary cells, and
  an upper limit value of the number of the plurality of secondary cells reported by the MAC control element for the BFR is configured based on higher layer signaling.

* * * * *